(12) United States Patent
Wang

(10) Patent No.: US 10,132,469 B2
(45) Date of Patent: Nov. 20, 2018

(54) LIGHT-PERMEABLE FIXING COMPONENT

(71) Applicant: Ting-Jui Wang, New Taipei (TW)

(72) Inventor: Ting-Jui Wang, New Taipei (TW)

( * ) Notice: Subject to any disclaimer, the term of this patent is extended or adjusted under 35 U.S.C. 154(b) by 0 days.

(21) Appl. No.: 14/262,483

(22) Filed: Apr. 25, 2014

(65) Prior Publication Data

US 2014/0321901 A1  Oct. 30, 2014

Related U.S. Application Data

(63) Continuation-in-part of application No. 13/940,131, filed on Jul. 11, 2013.

(30) Foreign Application Priority Data

Apr. 30, 2013  (TW) .............................. 102115487 A

(51) Int. Cl.
| | |
|---|---|
| *F16M 13/00* | (2006.01) |
| *F21V 11/14* | (2006.01) |
| *F16B 5/02* | (2006.01) |
| *F16B 5/04* | (2006.01) |

(52) U.S. Cl.
CPC .................. *F21V 11/14* (2013.01); *F16B 5/02* (2013.01); *F16B 5/04* (2013.01); *Y10T 403/28* (2015.01)

(58) Field of Classification Search
USPC ............. 248/222.14, 231.21, 231.9; 362/396
See application file for complete search history.

(56) References Cited

U.S. PATENT DOCUMENTS

| | | | | | |
|---|---|---|---|---|---|
| 3,887,803 | A | * | 6/1975 | Savage, Jr. ................... | 362/363 |
| 4,195,330 | A | * | 3/1980 | Savage, Jr. ................... | 362/655 |
| 5,440,468 | A | * | 8/1995 | Savage, Jr. ................... | 362/655 |
| 5,848,839 | A | * | 12/1998 | Savage, Jr. ................... | 362/267 |
| 5,961,083 | A | * | 10/1999 | Hartmann et al. ....... | 248/222.14 |
| 7,594,747 | B2 | * | 9/2009 | Tsai .................. | G02F 1/133608 |
| | | | | | 362/614 |
| 2008/0247156 | A1* | | 10/2008 | McCants ....................... | 362/157 |
| 2012/0217862 | A1* | | 8/2012 | Matsuda ................. | F21K 9/232 |
| | | | | | 313/46 |

* cited by examiner

*Primary Examiner* — Steven M Marsh
(74) *Attorney, Agent, or Firm* — Muncy, Geissler, Olds & Lowe, P.C.

(57) ABSTRACT

A light-permeable fixing component includes a fixed body and a receiving channel. The fixed body has a fixing portion disposed on around an outer surface thereof, and the fixing portion can be in the form of a thread, hook engagement bodies, snap-engagement bodies and a column body. The receiving channel is axially extended through a full length of the fixed body to form a light-in opening and a light-out opening at a tail end and a head end of the fixed body, respectively. Light beams emitted from a light source near the tail end can be transferred and guided by the receiving channel from the light-in opening to the light-out opening, so that the light-permeable fixing component is capable of guiding light, emitting light, glittering, decoration and indicating a constant depth.

1 Claim, 43 Drawing Sheets

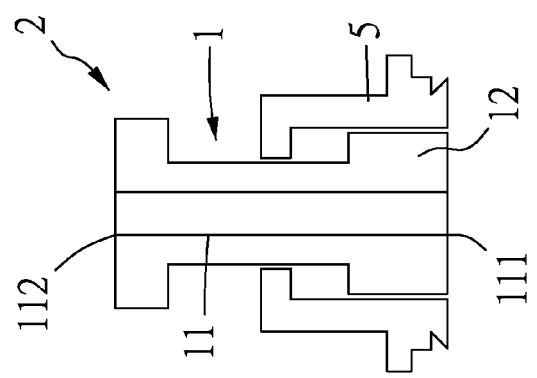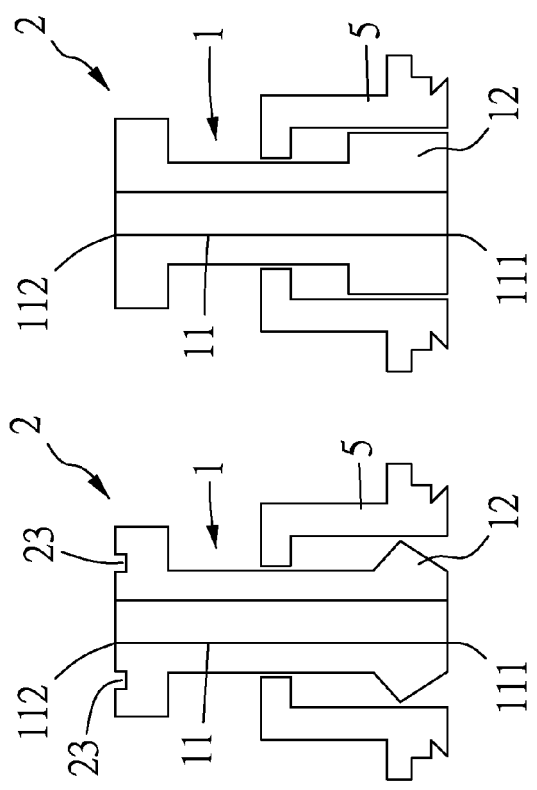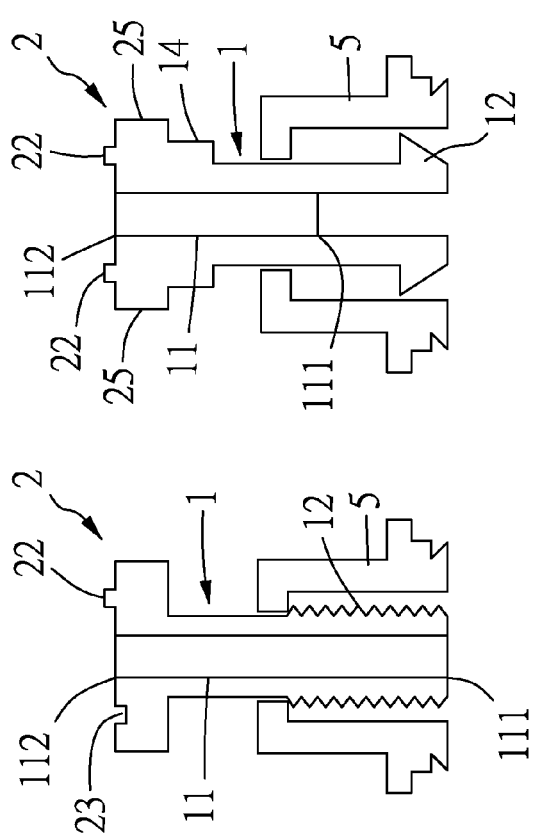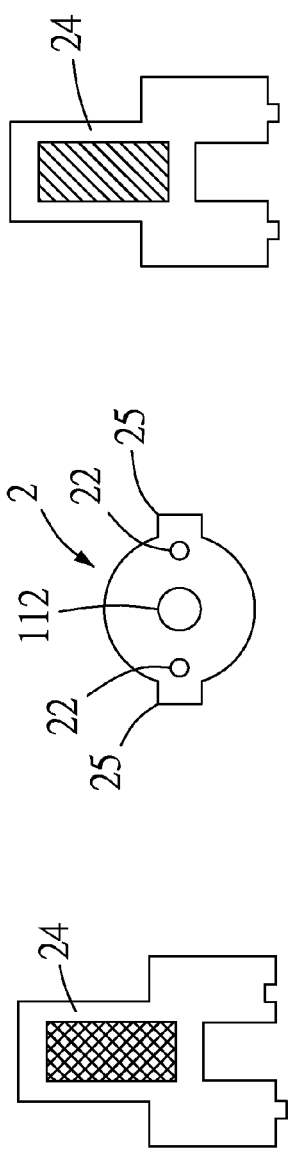

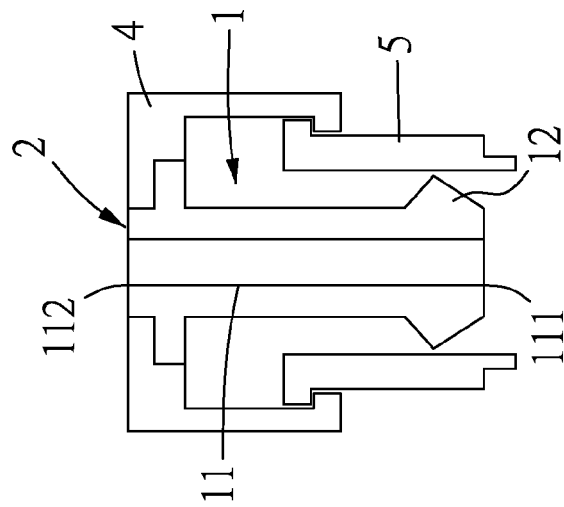
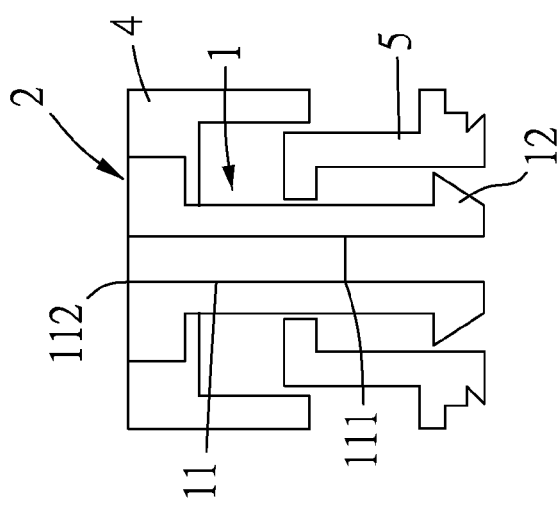
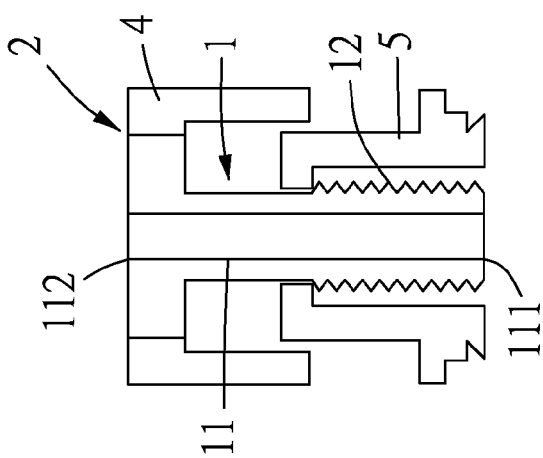

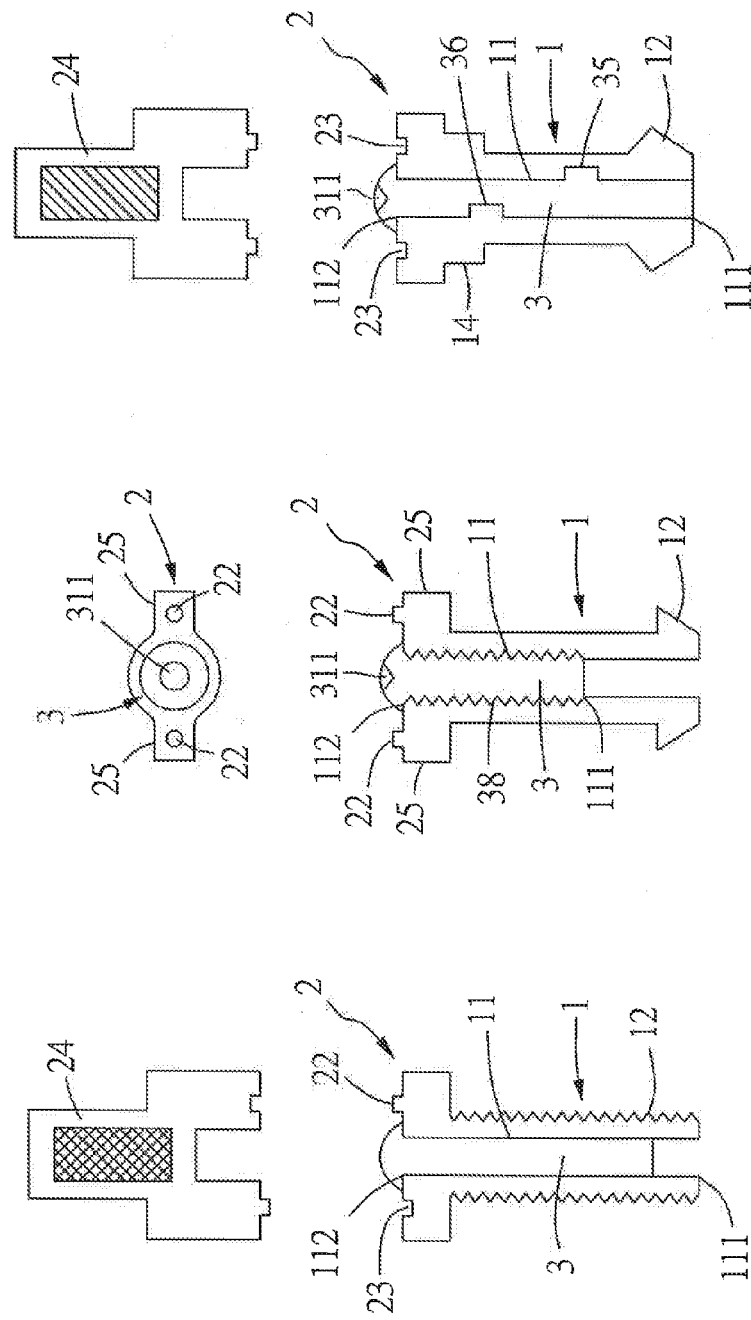

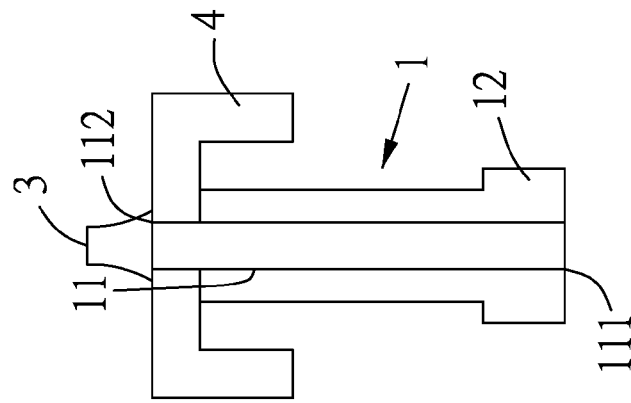
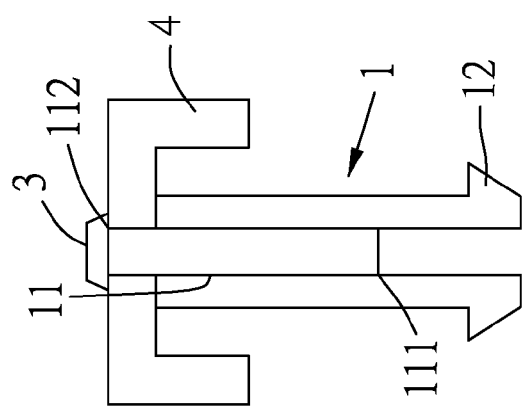
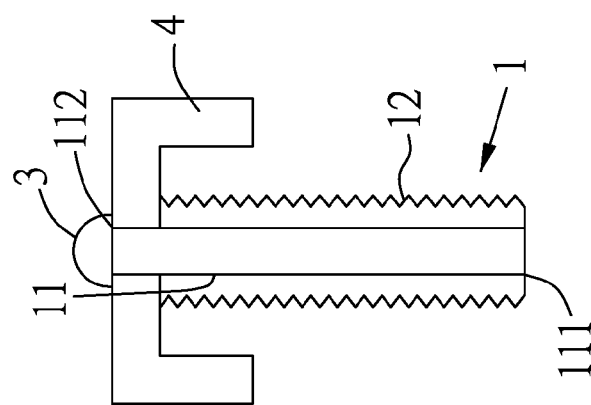
FIG.16c
FIG.16b
FIG.16a

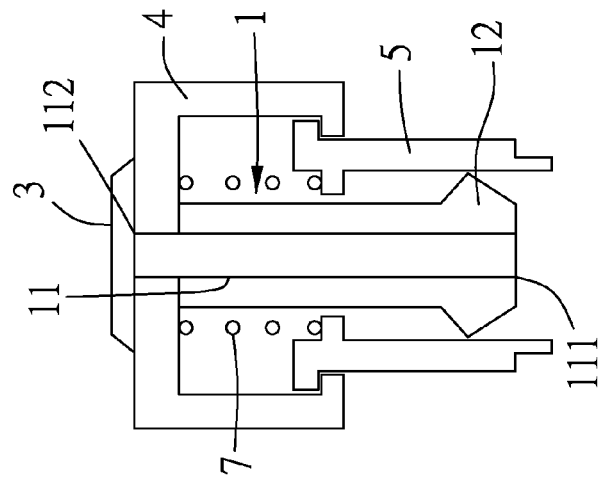
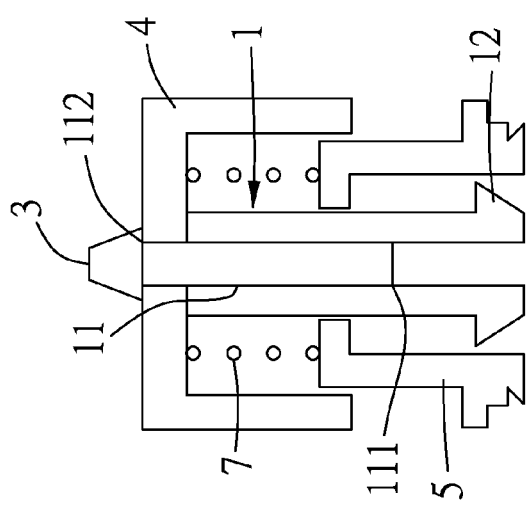
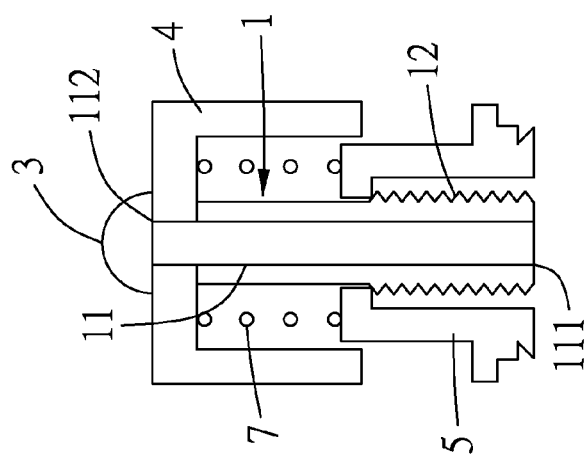
FIG.34c
FIG.34b
FIG.34a

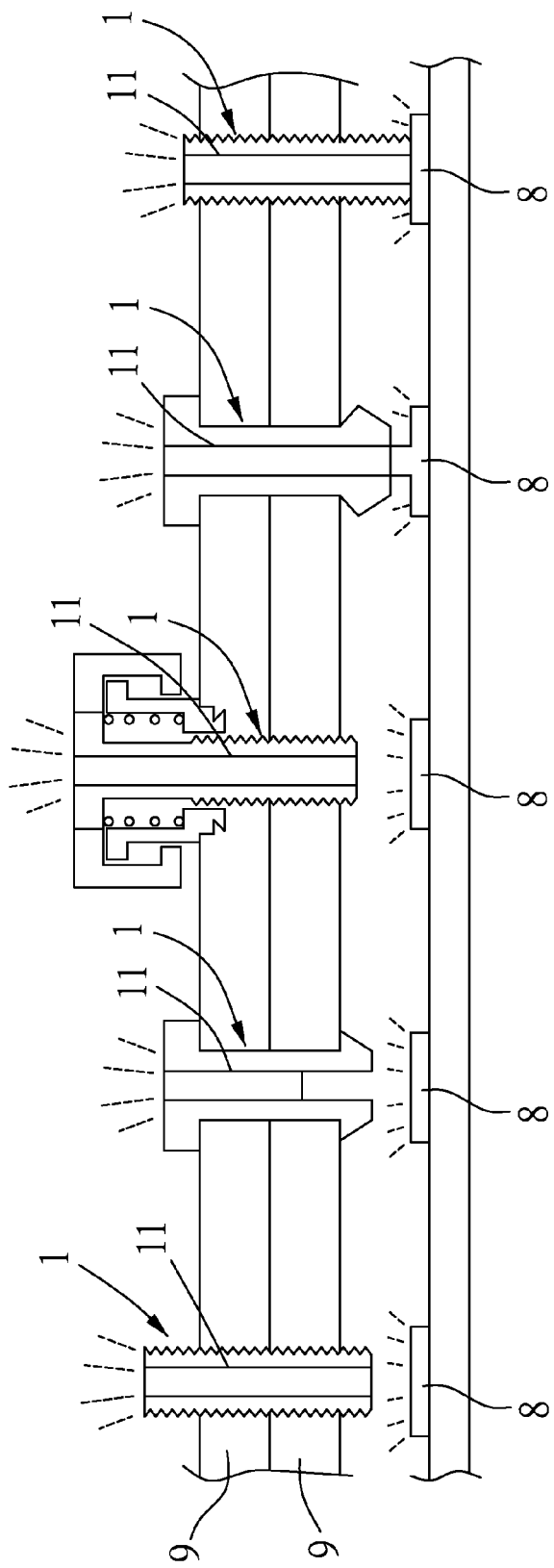

LIGHT-PERMEABLE FIXING COMPONENT

CROSS-REFERENCE TO RELATED APPLICATION

This application is a continuation-in-part patent application of U.S. application Ser. No. 13/940,131 filed on Jul. 11, 2013, the entire contents of which are hereby incorporated by reference for which priority is claimed under 35 U.S.C. § 120.

FIELD OF THE INVENTION

The present invention relates to light-permeable fixing components, and more particularly, to a light-permeable fixing component capable of guiding light, emitting light, glittering, decoration and indicating a constant depth when illuminated.

BACKGROUND OF THE INVENTION

The purpose of a conventional fixing component is to fix an object to another object. However, at a dark place, the conventional fixing component cannot be perceived readily and thus cannot be repaired properly. Furthermore, the conventional fixing component itself is fixed to an object monotonously, and in consequence the resultant finished product is monotonous in appearance. Also, if the conventional fixing component has to be fixed to a constant depth, the conventional fixing component will have to be measured with a tool of measurement, thereby rendering it inconvenient to fix the object in place with.

Accordingly, it is imperative to provide a light-permeable fixing component capable of guiding light, emitting light, glittering, decoration and indicating a constant depth when illuminated.

SUMMARY OF THE INVENTION

In view of the aforesaid drawbacks of the prior art, the inventor of the present invention conceived room for improvement in the prior art and thus conducted extensive researches and experiments according to the inventor's years of experience in the related industry, and finally developed a light-permeable fixing component capable of guiding light, emitting light, glittering, decoration and indicating a constant depth when illuminated.

In order to achieve the above and other objectives, the present invention provides, in the first embodiment, a light-permeable fixing component comprising: a fixed body having a fixing portion, the fixing portion being disposed at the fixed body and being one of a thread, hook engagement bodies, snap-engagement bodies and a column body; and a receiving channel penetrating the fixed body to form a light-in opening and a light-out opening at a tail end and a head end of the fixed body, respectively.

The present invention provides, in the second embodiment, a light-permeable fixing component comprising: a fixed head portion; a fixed body connected to the fixed head portion and having a fixing portion, the fixing portion being disposed at the fixed body and being one of a thread, hook engagement bodies, snap-engagement bodies and a column body; and a receiving channel penetrating the fixed head portion and the fixed body to form a light-in opening at a tail end of the fixed body and a light-out opening on a top side of the fixed head portion.

The present invention provides, in the third embodiment, a light-permeable fixing component comprising: a fixed head portion; a fixed body connected to the fixed head portion and having a fixing portion, the fixing portion being disposed at the fixed body and being one of a thread, hook engagement bodies, snap-engagement bodies and a column body; a receiving channel penetrating the fixed head portion and the fixed body to form a light-in opening at a tail end of the fixed body and a light-out opening on a top side of the fixed head portion; and a sleeve movably connected to the fixed body.

The present invention provides, in the fourth embodiment, a light-permeable fixing component is similar to the first embodiment but further comprises a cap. In the fourth embodiment, the fixed body is connected to the cap, and the receiving channel penetrates the cap to form the light-in opening at the tail end of the fixed body and the light-out opening on a top side of the cap.

The present invention provides, in the fifth embodiment, a light-permeable fixing component is similar to the second embodiment but further comprises a cap. In the fifth embodiment, the fixed head portion is connected to the cap, and the receiving channel penetrates the cap.

The present invention provides, in the sixth embodiment, a light-permeable fixing component is similar to the third embodiment but further comprises a cap. In the sixth embodiment, the fixed head portion is connected to the cap, the receiving channel penetrates the cap, and the sleeve is movably connected to the fixed body or the cap.

According to the present invention, the light-permeable fixing component in the first embodiment can further comprise a light-permeable body mounted on the light-permeable fixing component at a predetermined position by way of insert injection, press-in, engagement, snap-engagement, thermal fusion, screwing or adhesion; the predetermined position on the light-permeable fixing component for mounting the light-permeable body including any one of the light-out opening and the receiving channel, and the light-permeable body mounted in the receiving channel having two opposite ends, which can be flush with or protruded from any one or both of the light-in opening and the light-out opening; wherein when the light-permeable body is to be adhered to any one of the light-out opening and the receiving channel, an adhesive agent is first sprayed or coated on areas of the light-permeable body that are to be adhered to the light-out opening or the receiving channel, or on areas of the light-out opening or the receiving channel that are to be adhered to the light-permeable body.

According to the present invention, the light-permeable fixing component in the second embodiment can further comprise a light-permeable body mounted on the light-permeable fixing component at a predetermined position by way of insert injection, press-in, engagement, snap-engagement, thermal fusion, screwing or adhesion; the predetermined position on the light-permeable fixing component for mounting the light-permeable body including any one of the light-out opening and the receiving channel, and the light-permeable body mounted in the receiving channel having two opposite ends, which can be flush with or protruded from any one or both of the light-in opening and the light-out opening; wherein when the light-permeable body is to be adhered to any one of the light-out opening and the receiving channel, an adhesive agent is first sprayed or coated on areas of the light-permeable body that are to be adhered to the light-out opening or the receiving channel, or on areas of the light-out opening or the receiving channel that are to be adhered to the light-permeable body.

According to the present invention, the light-permeable fixing component in the third embodiment can further comprise a light-permeable body mounted on the light-permeable fixing component at a predetermined position by way of insert injection, press-in, engagement, snap-engagement, thermal fusion, screwing or adhesion; the predetermined position on the light-permeable fixing component for mounting the light-permeable body including any one of the light-out opening and the receiving channel, and the light-permeable body mounted in the receiving channel having two opposite ends, which can be flush with or protruded from any one or both of the light-in opening and the light-out opening; wherein when the light-permeable body is to be adhered to any one of the light-out opening and the receiving channel, an adhesive agent is first sprayed or coated on areas of the light-permeable body that are to be adhered to the light-out opening or the receiving channel, or on areas of the light-out opening or the receiving channel that are to be adhered to the light-permeable body.

According to the present invention, the light-permeable fixing component in the fourth embodiment can further comprise a light-permeable body mounted on the light-permeable fixing component at a predetermined position by way of insert injection, press-in, engagement, snap-engagement, thermal fusion, screwing or adhesion; the predetermined position on the light-permeable fixing component for mounting the light-permeable body including any one of the light-out opening and the receiving channel, and the light-permeable body mounted in the receiving channel having two opposite ends, which can be flush with or protruded from any one or both of the light-in opening and the light-out opening; wherein when the light-permeable body is to be adhered to any one of the light-out opening and the receiving channel, an adhesive agent is first sprayed or coated on areas of the light-permeable body that are to be adhered to the light-out opening or the receiving channel, or on areas of the light-out opening or the receiving channel that are to be adhered to the light-permeable body.

According to the present invention, the light-permeable fixing component in the fifth embodiment can further comprise a light-permeable body mounted on the light-permeable fixing component at a predetermined position by way of insert injection, press-in, engagement, snap-engagement, thermal fusion, screwing or adhesion; the predetermined position on the light-permeable fixing component for mounting the light-permeable body including any one of the light-out opening and the receiving channel, and the light-permeable body mounted in the receiving channel having two opposite ends, which can be flush with or protruded from any one or both of the light-in opening and the light-out opening; wherein when the light-permeable body is to be adhered to any one of the light-out opening and the receiving channel, an adhesive agent is first sprayed or coated on areas of the light-permeable body that are to be adhered to the light-out opening or the receiving channel, or on areas of the light-out opening or the receiving channel that are to be adhered to the light-permeable body.

According to the present invention, the light-permeable fixing component in the sixth embodiment can further comprise a light-permeable body mounted on the light-permeable fixing component at a predetermined position by way of insert injection, press-in, engagement, snap-engagement, thermal fusion, screwing or adhesion; the predetermined position on the light-permeable fixing component for mounting the light-permeable body including any one of the light-out opening and the receiving channel, and the light-permeable body mounted in the receiving channel having two opposite ends, which can be flush with or protruded from any one or both of the light-in opening and the light-out opening; wherein when the light-permeable body is to be adhered to any one of the light-out opening and the receiving channel, an adhesive agent is first sprayed or coated on areas of the light-permeable body that are to be adhered to the light-out opening or the receiving channel, or on areas of the light-out opening or the receiving channel that are to be adhered to the light-permeable body.

In the second embodiment of the present invention, when the light-permeable body is mounted in the receiving channel with an end protruded from the light-out opening, the end of the light-permeable body protruded from the light-out opening is provided with a conical recess.

In the third embodiment of the present invention, when the light-permeable body is mounted in the receiving channel with an end protruded from the light-out opening, the end of the light-permeable body protruded from the light-out opening is provided with a conical recess.

In the second embodiment of the present invention, the conical recess has an opening angle smaller than 180 degrees.

In the third embodiment of the present invention, the conical recess has an opening angle smaller than 180 degrees.

In the second embodiment of the present invention, the opening angle of the conical recess is preferably larger than 20 degrees and smaller than 120 degrees.

In the third embodiment of the present invention, the opening angle of the conical recess is preferably larger than 20 degrees and smaller than 120 degrees.

In the second embodiment of the present invention, the fixed head portion can be provided with a wing-like structure.

In the third embodiment of the present invention, the fixed head portion can be provided with a wing-like structure.

In the second embodiment of the present invention, a neck portion can be further provided between and connected to the fixed head portion and the fixed body, and the neck portion has a cross sectional area smaller than that of the fixed head portion and larger than that of the fixed body.

In the third embodiment of the present invention, a neck portion can be further provided between and connected to the fixed head portion and the fixed body, and the neck portion has a cross sectional area smaller than that of the fixed head portion and larger than that of the fixed body.

In the second embodiment of the present invention, the fixed head portion can be further provided on the top side around the light-out opening with a plurality of ribs, a plurality of grooves, or a combination of at least one rib and at least one groove for operating with a spanner.

In the third embodiment of the present invention, the fixed head portion can be further provided on the top side around the light-out opening with a plurality of ribs, a plurality of grooves, or a combination of at least one rib and at least one groove for operating with a spanner.

Accordingly, the light-permeable fixing component of the present invention is capable of guiding light, emitting light, glittering, decoration and indicating a constant depth when illuminated.

BRIEF DESCRIPTION OF THE DRAWINGS

Objectives, features, and advantages of the present invention are hereunder illustrated with specific embodiments in conjunction with the accompanying drawings, in which:

FIGS. 3a to 3d are longitudinal sectional views of some variants of a light-permeable fixing component according to a third embodiment of the present invention;

FIGS. 6a to 6c are longitudinal sectional views of some variants of a light-permeable fixing component according to a sixth embodiment of the present invention;

FIGS. 12a to 12f are longitudinal sectional views showing the variants of the light-permeable fixing component according to the second embodiment of the present invention can respectively further include a light-permeable body mounted in a receiving channel thereof to protrude from one or both ends of the receiving channel;

FIGS. 16a to 16c are longitudinal sectional views showing the variants of the light-permeable fixing component according to the fourth embodiment of the present invention can respectively further include a light-permeable body mounted on a head end thereof;

FIGS. 34*a* to 34*c* are longitudinal sectional views showing the variants of the light-permeable fixing component according to the first embodiment of the present invention can respectively further include a cap, a sleeve member, an elastic member and a light-permeable body, with the light-permeable body mounted on a head end of the light-permeable fixing component;

FIGS. 35 to 37 schematically show some examples of application of different embodiments and variants of the light-permeable fixing component of the present invention;

DETAILED DESCRIPTION OF THE PREFERRED EMBODIMENTS

Figure 1D:
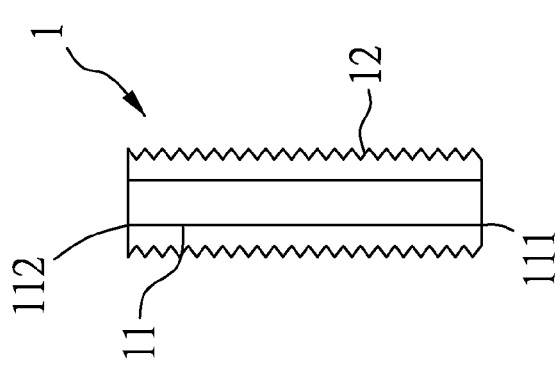
FIGS. 1a to 1d are longitudinal sectional views of some variants of a light-permeable fixing component according to a first embodiment of the present invention.

The present invention will now be described with some preferred embodiments thereof and with reference to the accompanying drawings. For the purpose of easy to understand, elements that are the same in the preferred embodiments are denoted by the same reference numerals.

Figure 1C:
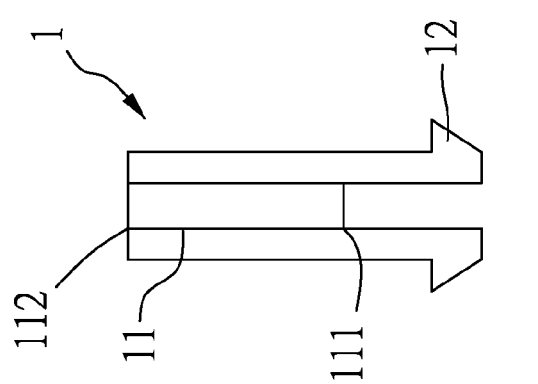
Figure 1B:
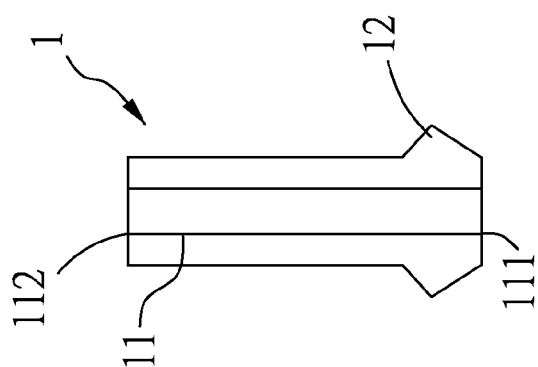
Figure 1A:
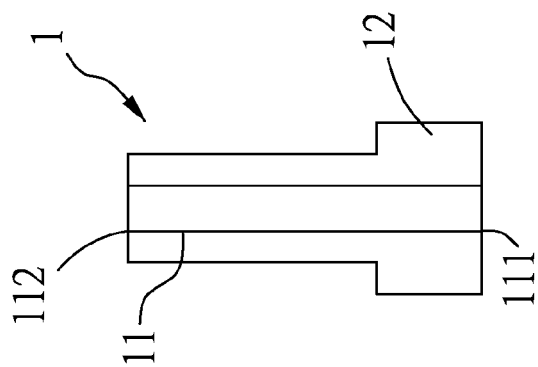

Please refer to FIGS. 1*a* to 1*d*, in which some variants of a light-permeable fixing component according to a first embodiment of the present invention are shown. As shown, the light-permeable fixing component in the first embodiment includes a fixed body 1 and a receiving channel 11. The fixed body 1 can be in the form of a bar, such as a round bar or a square bar, with a fixing portion 12 provided on around an outer surface thereof. According to different variants of the first embodiment, the fixing portion 12 can be in the form of, for example, a thread as shown in FIG. 1*a*, one or more hook engagement bodies as shown in FIG. 1*b*, one or more snap-engagement bodies as shown in FIG. 1*c*, or a column body as shown in FIG. 1*d*. In the case of being one or more hook engagement bodies or snap-engagement bodies, the fixing portion 12 can provide some degree of elasticity. While the hook engagement body and the snap-engagement body respectively shown in FIGS. 1*b* and 1*c* are not provided with grooves, it is understood the hook engagement body and the snap-engagement body can be optionally provided with some grooves thereon. In the case of being a column body, the fixing portion 12 can have a round, a square or any other geometrical cross section. To use the fourth variant of the first embodiment as shown in FIG. 1*d* to fasten two workpieces together, simply insert the fixing portion 12 into two fixing holes provided on the two workpieces, and the column body will sidewardly interfere with or frictionally contact with the fixing holes to thereby hold the two workpieces in place or connect them to each other. The fixing portion 12 can be provided on around a whole outer surface of the fixed body 1, or on around only a part of the outer surface of the fixed body 1, such as on around an upper part, a middle part or a lower part, or any combination thereof, of the fixed body 1. The receiving channel 11 penetrates the fixed body 1 from a head end to a tail end of the fixed body 1, such that a light-in opening 111 and a light-out opening 112 are respectively formed at the tail end and the head end of the fixed body 1. To mount the light-permeable fixing component of the present invention, a user may hold the fixed body 1 at the head end thereof to control other parts of the fixed body 1 for fastening two workpieces together.

Figures 2A, 2B, 2C, 2D:
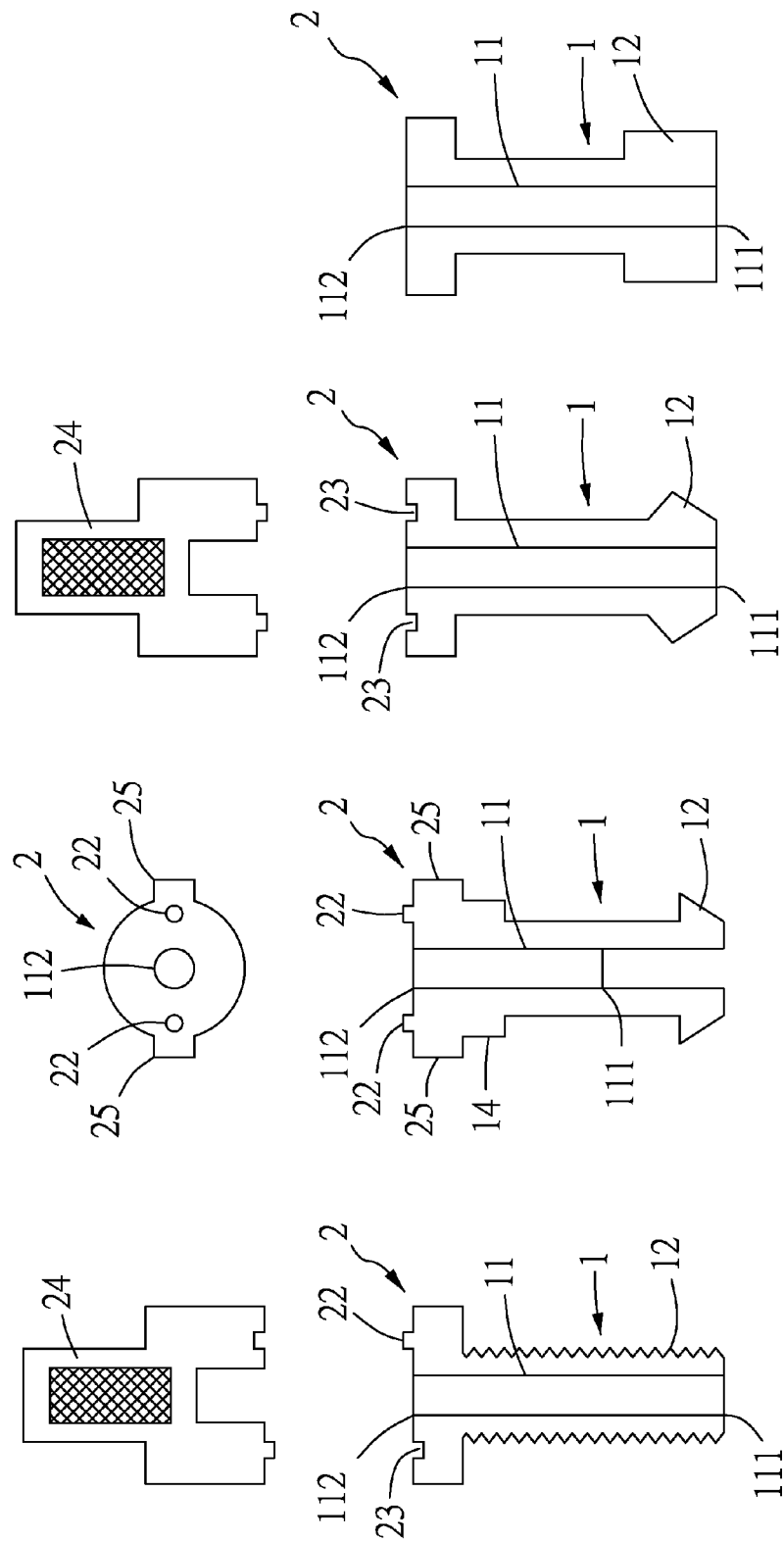
FIGS. 2a to 2d are longitudinal sectional views of some variants of a light-permeable fixing component according to a second embodiment of the present invention.

FIGS. 2*a* to 2*d* show some variants of a light-permeable fixing component according to a second embodiment of the present invention. As shown, in the second embodiment, the light-permeable fixing component includes a fixed body 1, a receiving channel 11, and a fixed head portion 2. The fixed body 1 and the fixed head portion 2 can be integrally formed to connect with each other. The fixed body 1 can be in the form of a bar, such as a round bar or a square bar, with a fixing portion 12 provided on around an outer surface thereof. According to different variants of the second embodiment, the fixing portion 12 can be in the form of, for example, a thread as shown in FIG. 2*a*, one or more hook engagement bodies as shown in FIG. 2*b*, one or more snap-engagement bodies as shown in FIG. 2*c*, or a column body as shown in FIG. 2*d*. The fixing portion 12 can be provided on around a whole outer surface of the fixed body 1, or on around only a part of the outer surface of the fixed body 1, such as on around an upper part, a middle part or a lower part, or any combination thereof, of the fixed body 1. The receiving channel 11 penetrates the fixed head portion 2 and the fixed body 1, such that a light-in opening 111 and a light-out opening 112 are respectively formed at a tail end of the fixed body 1 and a top side the fixed head portion 2. The fixed head portion 2 has a sectional area larger than that of the fixed body 1, allowing a user to handle the light-permeable fixing component in an effortless manner. To mount the light-permeable fixing component of the present invention, a user may hold the light-permeable fixing component at the fixed head portion 2 to control other parts of the fixed body 1 for fastening two workpieces together.

FIGS. 3a to 3d show some variants of a light-permeable fixing component according to a third embodiment of the present invention. As shown, in the third embodiment, the light-permeable fixing component includes a fixed body 1, a receiving channel 11, a fixed head portion 2, and a sleeve 5. The fixed body 1 and the fixed head portion 2 can be integrally formed to connect with each other. The fixed body 1 can be in the form of a bar, such as a round bar or a square bar, with a fixing portion 12 provided on around an outer surface thereof. According to different variants of the third embodiment, the fixing portion 12 can be in the form of, for example, a thread as shown in FIG. 3a, one or more hook engagement bodies as shown in FIG. 3b, one or more snap-engagement bodies as shown in FIG. 3c, or a column body as shown in FIG. 3d. The fixing portion 12 can be provided on around a whole outer surface of the fixed body 1, or on around only a part of the outer surface of the fixed body 1, such as on around an upper part, a middle part or a lower part, or any combination thereof, of the fixed body 1. The receiving channel 11 penetrates the fixed head portion 2 and the fixed body 1, such that a light-in opening 111 and a light-out opening 112 are respectively formed at a tail end of the fixed body 1 and a top side of the fixed head portion 2. The fixed head portion 2 has a sectional area larger than that of the fixed body 1, allowing a user to handle the light-permeable fixing component in an effortless manner. The sleeve 5 is movably connected to the fixed body 1. As shown in FIGS. 3a to 3d, the sleeve 5 can have an upper end formed into a radially inward protruded flange portion, which is directly movably rested on the fixing portion 12. Alternatively, the light-permeable fixing component can further include a stop ring (not shown) movably fitted on around the fixing portion 12, and the sleeve 5 can have an upper end formed into a radially inward protruded flange portion for movably resting on the stop ring to thereby indirectly movably rest on the fixing portion 12. To mount the light-permeable fixing component of the present invention, a user may hold the light-permeable fixing component at the fixed head portion 2 to control other parts of the fixed body 1 for fastening two workpieces together.

In all the above three embodiments, the light-permeable fixing component is so structured that light beams from a light source (not shown) near the light-in opening 111 can be guided by the receiving channel 11 to the light-out opening 112, making the light-permeable fixing component luminous. Moreover, in the event of having a flashing light source, the light-permeable fixing component of the present invention can also show flashing light. Thus, the light-permeable fixing component of the present invention also provides light-guiding, illuminating, flashing and decorating effects. The light source can be so designed that it is actuated to emit light when the light-permeable fixing component of the present invention is driven into the workpieces by a predetermined depth and brings the light-in opening 111 to touch the light source. Again, the light emitted by the light source can be guided by the receiving channel 11 from the light-in opening 111 to the light-out opening 112 to lighten the light-permeable fixing component, giving the light-permeable fixing component of the present invention the function of indicating a specified depth.

Figure 4C:
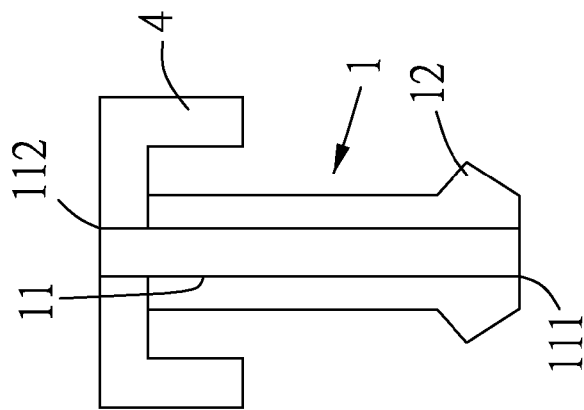
FIGS. 4a to 4c are longitudinal sectional views of some variants of a light-permeable fixing component according to a fourth embodiment of the present invention.
Figure 4B:
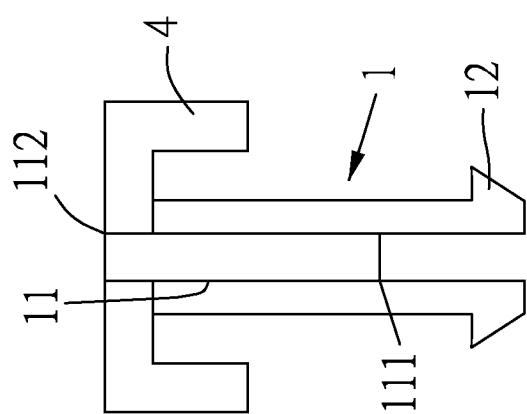
Figure 4A:
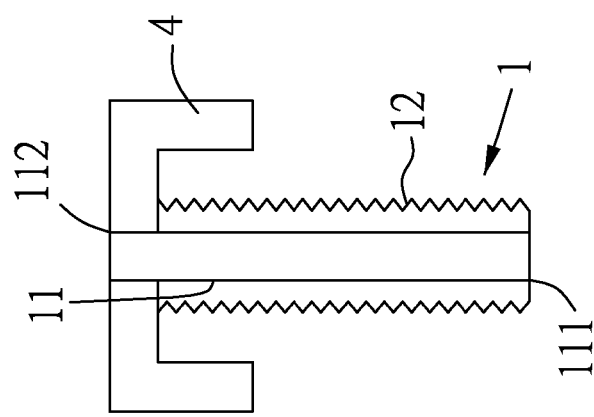

FIGS. 4a to 4c show some variants of a light-permeable fixing component according to a fourth embodiment of the present invention. As shown, the fourth embodiment is similar to the first embodiment shown in FIGS. 1a to 1d, but further includes a cap 4. The cap 4 and the fixed body 1 can integrally formed to connect to each other. The receiving channel 11 penetrates the cap 4 and the fixed body 1, such that a light-in opening 111 and a light-out opening 112 are respectively formed at a tail end of the fixed body 1 and at a top side of the cap 4. The cap 4 can be used to connect to, cover or protect other objects. To mount the light-permeable fixing component according to the fourth embodiment, a user may hold the light-permeable fixing component at the cap 4 to control other parts of the fixed body 1 for fastening two workpieces together.

Figure 5A:
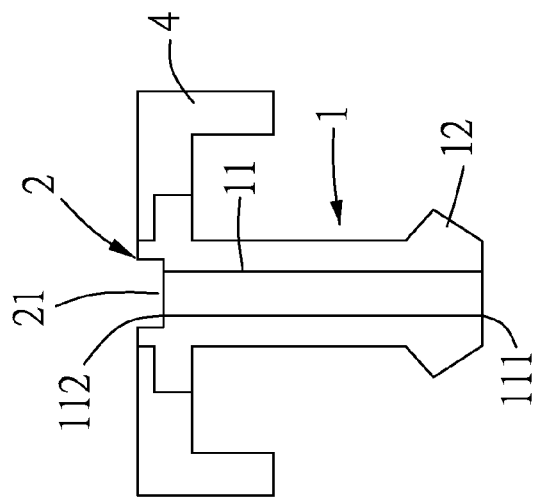
FIGS. 5a to 5c are longitudinal sectional views of some variants of a light-permeable fixing component according to a fifth embodiment of the present invention.
Figure 5B:
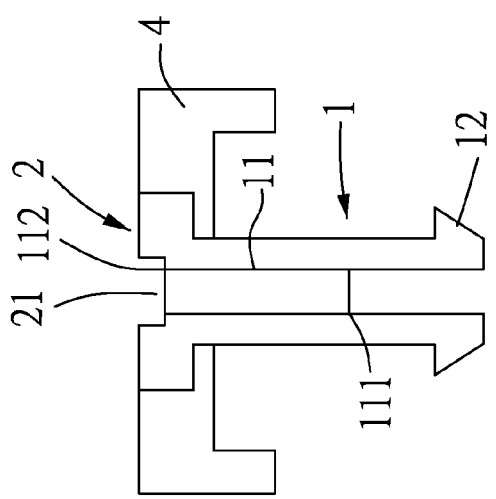
Figure 5C:
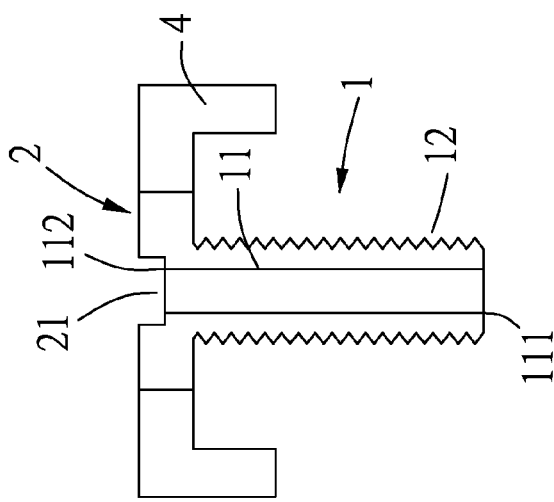

FIGS. 5a to 5c show some variants of a light-permeable fixing component according to a fifth embodiment of the present invention. As shown, the fifth embodiment is similar to the second embodiment shown in FIGS. 2a to 2d, but further includes a cap 4. The cap 4 and the fixed head portion 2 can be integrally formed to connect to each other. The receiving channel 11 penetrates the cap 4. The cap 4 can be used to connect to, cover or protect other objects. To mount the light-permeable fixing component according to the fifth embodiment, a user may hold the light-permeable fixing component at the cap 4 to control other parts of the fixed body 1 for fastening two workpieces together.

FIGS. 6a to 6c show some variants of a light-permeable fixing component according to a sixth embodiment of the present invention. As shown, the sixth embodiment is similar to the third embodiment shown in FIGS. 3a to 3d, but further includes a cap 4. The cap 4 and the fixed head portion 2 can be integrally formed to connect to each other. The receiving channel 11 penetrates the cap 4. In the sixth embodiment, the sleeve 5 can be movably connected to the fixed body 1 or the cap 4. The cap 4 can be used to connect to, cover or protect other objects. To mount the light-permeable fixing component according to the sixth embodiment, a user may hold the light-permeable fixing component at the cap 4 to control other parts of the fixed body 1 for fastening two workpieces together.

Figure 7A:
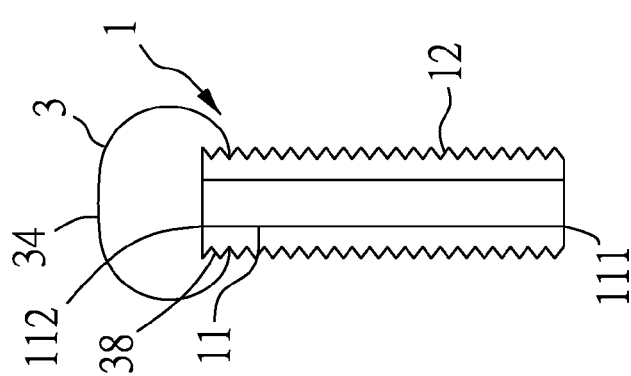
FIGS. 7a to 7c are longitudinal sectional views showing the variants of the light-permeable fixing component according to the first embodiment of the present invention can respectively further include a light-permeable body mounted on a head end thereof.
Figure 7B:
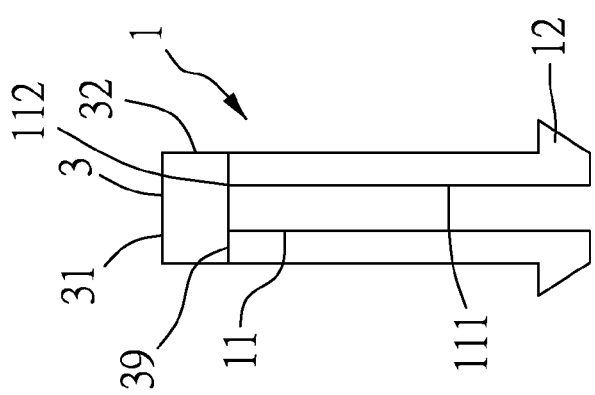
Figure 7C:
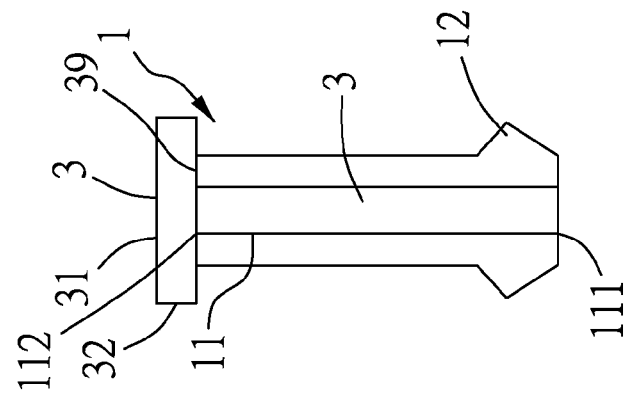
Figure 8C:
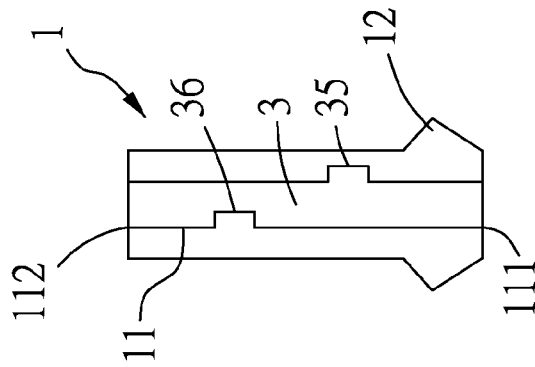
FIGS. 8a to 8c are longitudinal sectional views showing the variants of the light-permeable fixing component according to the first embodiment of the present invention can respectively further include a light-permeable body mounted in a receiving channel thereof.
Figure 8B:
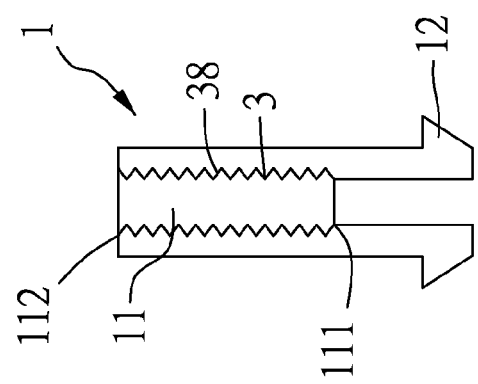
Figure 8A:
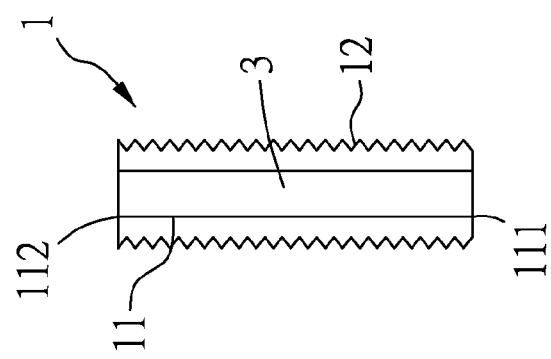
Figure 9C:
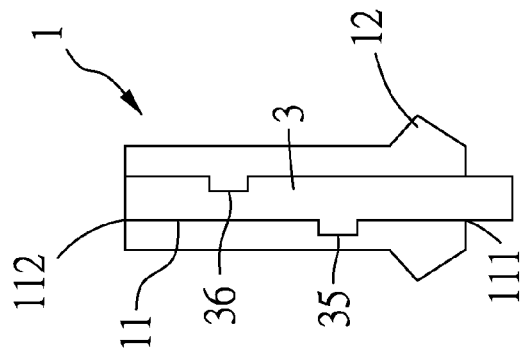
FIGS. 9a to 9c are longitudinal sectional views showing the variants of the light-permeable fixing component according to the first embodiment of the present invention can respectively further include a light-permeable body mounted in a receiving channel thereof to protrude from one or both ends of the receiving channel.
Figure 9B:
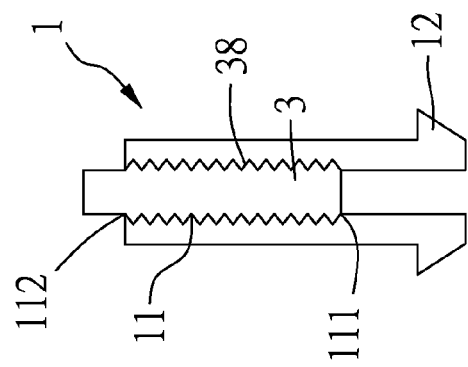
Figure 9A:
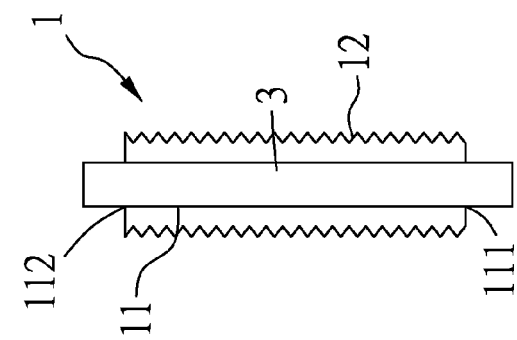

As shown in FIGS. 7a to 7c, FIGS. 8a to 8c and FIGS. 9a to 9c, the variants of the light-permeable fixing component according to the first embodiment of the present invention shown in FIGS. 1a to 1d can respectively further include a light-permeable body 3 mounted on the fixed body 1 at different positions by different ways, including but not limited to insert injection, press-in, engagement, snap-engagement, thermal fusion, screwing or adhesion. FIGS. 7a to 7c show the light-permeable body 3 is mounted at the light-out opening 112; FIGS. 8a to 8c show the light-permeable body 3 is mounted in the receiving channel 11; FIG. 9a shows the light-permeable body 3 is mounted in the receiving channel 11 with two opposite ends protruded from the light-in opening 111 and the light-out opening 112; FIG. 9b shows the light-permeable body 3 is mounted in the receiving channel 11 with an end protruded from the light-out opening 112; and FIG. 9c shows the light-permeable body 3 is mounted in the receiving channel 11 with an end protruded from the light-in opening 111. With these arrangements, light beams emitted by a light source and passing through the receiving channel 11 via the light-in opening 111 can be transferred and refracted by the light-permeable body 3 to further increase the luminous area visible on the light-permeable fixing component. In the case the light-permeable body 3 is to be adhered to the fixed body 1, an adhesive agent can be first sprayed or coated on areas of the light-permeable body 3 that are to be adhered to the light-out opening 112 as shown in FIGS. 7b and 7c; or on areas of the light-permeable body 3 that are to be adhered to the receiving channel 11 as shown in FIGS. 8a and 9a. Alternatively, the adhesive agent can be first sprayed or coated on areas outside the light-out opening 112 for adhering the light-permeable body 3 thereto, as shown in FIGS. 7b and 7c; or the adhesive agent can be first sprayed or coated on areas in the receiving channel 11 that are to contact with the light-permeable body 3, as shown in FIGS. 8a and 9a. In the case the light-permeable body 3 is mounted in the receiving channel 11, with or without protruding from the light-in opening 111 and/or the light-out opening 112, the light-permeable body 3 can be provided with a light source. In this case, the luminous areas visible on the light-permeable fixing component can also be expanded without the need of providing an additional light source outside the receiving channel 11.

Figure 10C:
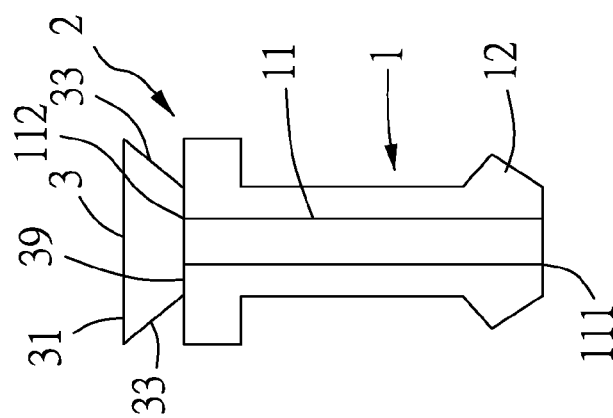
FIGS. 10a to 10c are longitudinal sectional views showing the variants of the light-permeable fixing component according to the second embodiment of the present invention can respectively further include a light-permeable body mounted on a head end thereof.
Figure 10B:
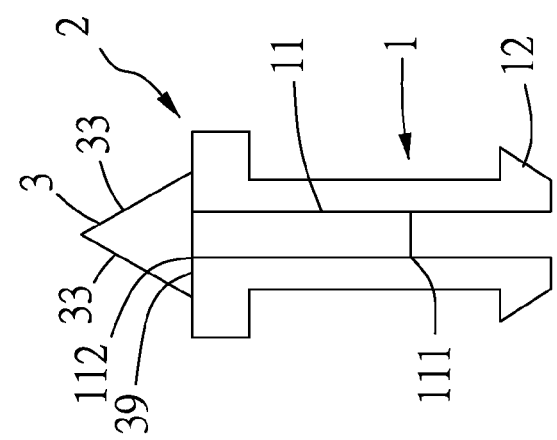
Figure 10A:
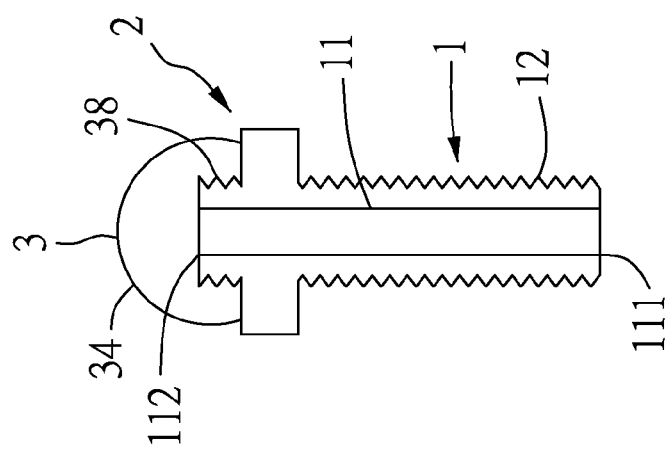
Figure 11C:
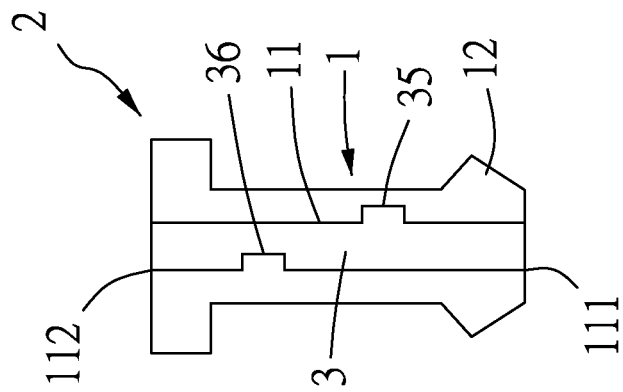
FIGS. 11a to 11c are longitudinal sectional views showing the variants of the light-permeable fixing component according to the second embodiment of the present invention can respectively further include a light-permeable body mounted in a receiving channel thereof.
Figure 11B:
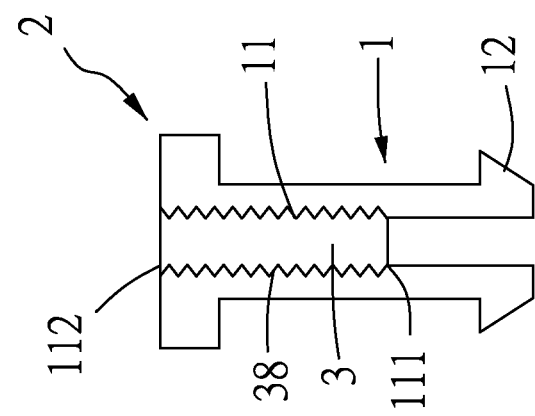
Figure 11A:
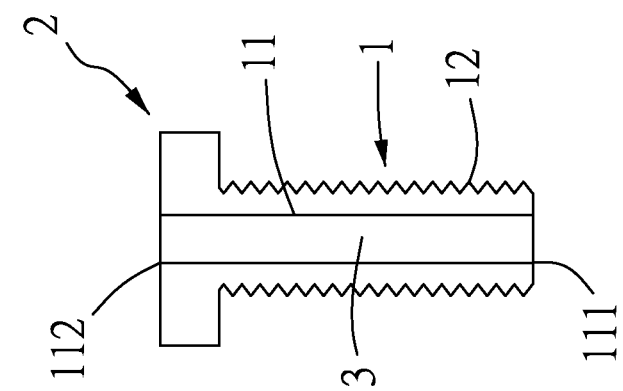
Figure 12A:
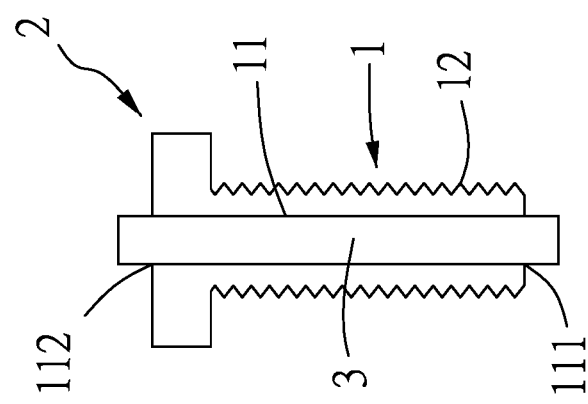
Figure 12B:
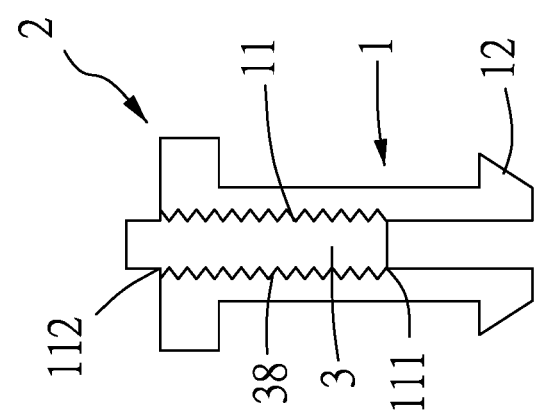
Figure 12C:
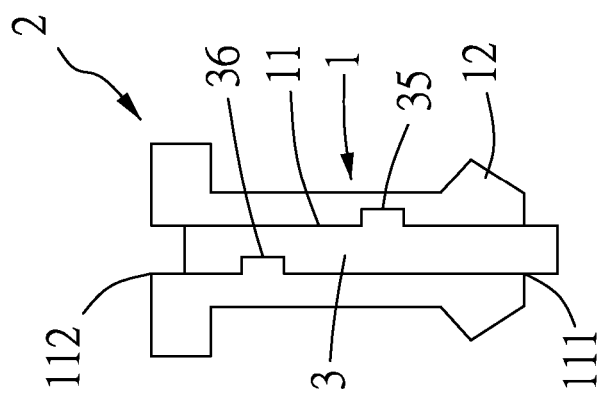

As shown in FIGS. 10a to 10c, FIGS. 11a to 11c and FIGS. 12a to 12f, the variants of the light-permeable fixing component according to the second embodiment of the present invention shown in FIGS. 2a to 2d can respectively further include a light-permeable body 3 mounted at different positions by different ways, including but not limited to insert injection, press-in, engagement, snap-engagement, thermal fusion, screwing or adhesion. FIGS. 10a to 10c show the light-permeable body 3 is mounted at the light-out opening 112; FIGS. 11a to 11c show the light-permeable body 3 is mounted in the receiving channel 11; FIG. 12a shows the light-permeable body 3 is mounted in the receiving channel 11 with two opposite ends protruded from the light-in opening 111 and the light-out opening 112; FIGS. 12b and 12d to 12f show the light-permeable body 3 is mounted in the receiving channel 11 with an end protruded from the light-out opening 112; and FIG. 12c shows the light-permeable body 3 is mounted in the receiving channel 11 with an end protruded from the light-in opening 111. With these arrangements, light beams emitted by a light source and passing through the receiving channel 11 and the fixed head portion 2 via the light-in opening 111 can be transferred and refracted by the light-permeable body 3 to further increase the luminous area visible on the light-permeable fixing component. In the case the light-permeable body 3 is to be adhered to the light-permeable fixing component, an adhesive agent can be first sprayed or coated on areas of the light-permeable body 3 that are to be adhered to the light-out opening 112 as shown in FIGS. 10b and 10c; or on areas of the light-permeable body 3 that are to be adhered to the receiving channel 11 as shown in FIGS. 11a, 12a and 12d. Alternatively, the adhesive agent can be first sprayed or coated on areas outside the light-out opening 112 for adhering the light-permeable body 3 thereto, as shown in FIGS. 10b and 10c; or the adhesive agent can be first sprayed or coated on areas in the receiving channel 11 that are to contact with the light-permeable body 3, as shown in FIGS. 11a, 12a and 12d. In the case the light-permeable body 3 is mounted in the receiving channel 11, with or without protruding from the light-in opening 111 and/or the light-out opening 112, the light-permeable body 3 can be provided with a light source. In this case, the luminous areas visible on the light-permeable fixing component can also be expanded without the need of providing an additional light source outside the receiving channel 11.

In the second embodiment of the present invention, the light-permeable body 3 can be mounted in the receiving channel 11 with an end protruded from the light-out opening 112. In this case, the end of the light-permeable body 3 that is protruded from the light-out opening 112 can be further provided on a top with a conical recess 311, as shown in FIGS. 12e and 12f. Whereby, light beams passing through the conical recess 311 can be gathered and refracted by the conical recess 311.

The conical recess 311 formed on the protruded end of the light-permeable body 3, as shown in FIGS. 12e and 12f, has an opening angle preferably smaller than 180 degrees, and more preferably larger than 20 degrees and smaller than 120 degrees.

Please refer to FIGS. 2b and 12e. In the light-permeable fixing component according to the second embodiment of the present invention, the fixed head portion 2 thereof can be further provided with a wing-like structure 25, which makes it easier to turn the light-permeable fixing component at the fixed head portion 2.

As shown in FIGS. 2b and 12f, the light-permeable fixing component in the second embodiment can further include a neck portion 14 between the fixed head portion 2 and the fixed body 1. The neck portion 14 has a cross sectional area smaller than that of the fixed head portion 2 and larger than that of the fixed body 1.

As shown in FIGS. 2a to 2c and FIGS. 12d to 12f, the fixed head portion 2 of the light-permeable fixing component according to the second embodiment of the present invention can be further provided on the top side around the light-out opening 112 or the light-permeable body 3 with a plurality of ribs 22, or a plurality of grooves 23, or a combination of at least one rib 22 and at least one groove 23. With these arrangements, the light-permeable fixing component can be turned and removed from the workpieces with a spanner 24 that can correspondingly engage with the ribs 22 and/or the grooves 23.

Figure 13C:
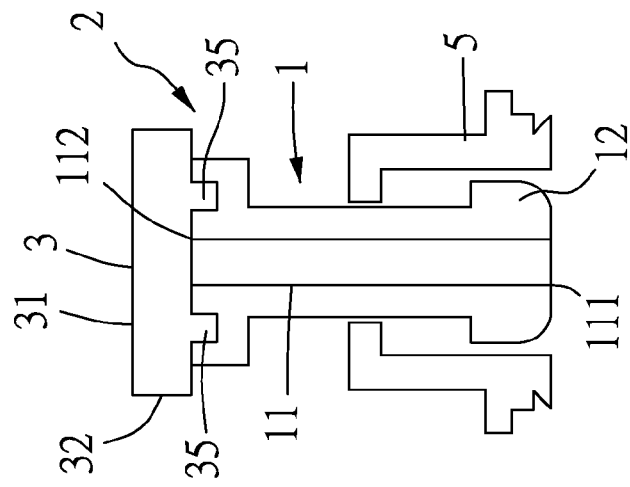
FIGS. 13a to 13c are longitudinal sectional views showing the variants of the light-permeable fixing component according to the third embodiment of the present invention can respectively further include a light-permeable body mounted on a head end thereof.
Figure 13B:
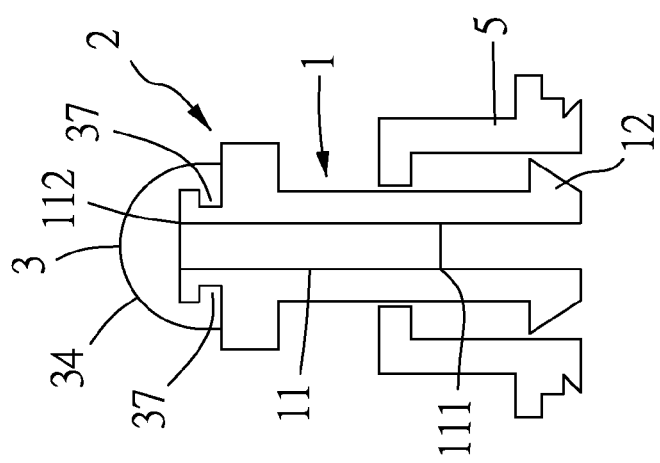
Figure 13A:
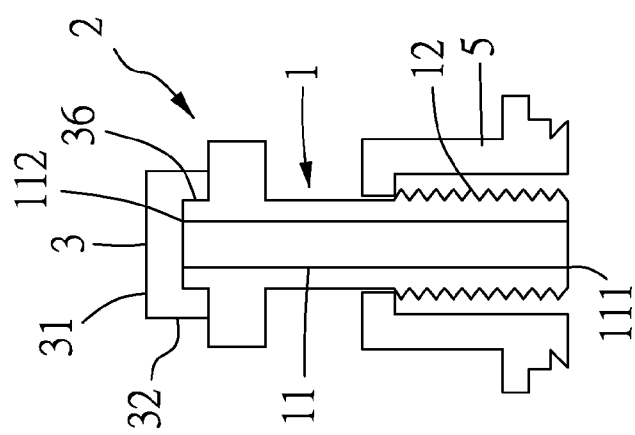
Figure 14C:
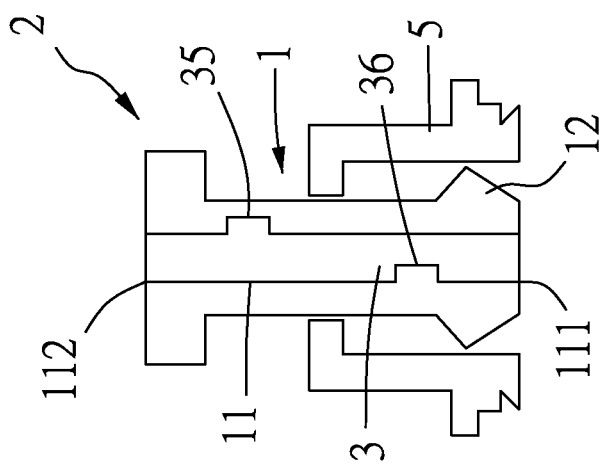
FIGS. 14a to 14c are longitudinal sectional views showing the variants of the light-permeable fixing component according to the third embodiment of the present invention can respectively further include a light-permeable body mounted in a receiving channel thereof.
Figure 14B:
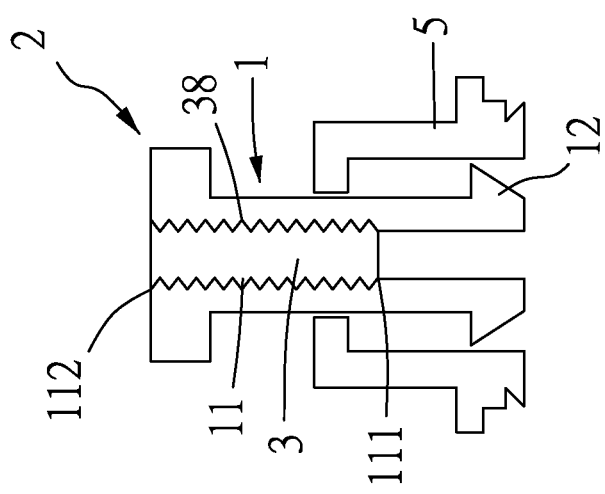
Figure 14A:
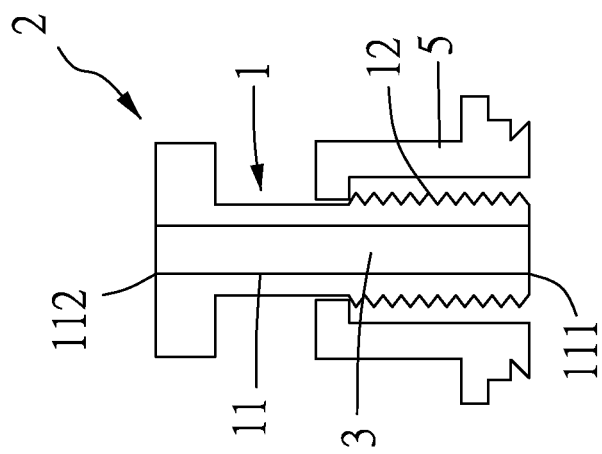
Figure 15C:
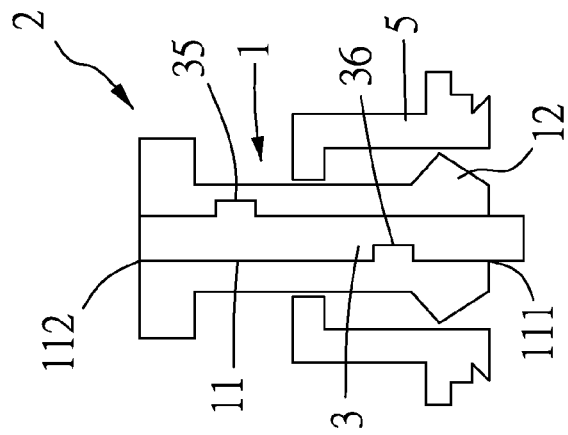
FIGS. 15a to 15f are longitudinal sectional views showing the variants of the light-permeable fixing component according to the third embodiment of the present invention can respectively further include a light-permeable body mounted in a receiving channel thereof to protrude from one of two ends of the receiving channel.
Figure 15B:
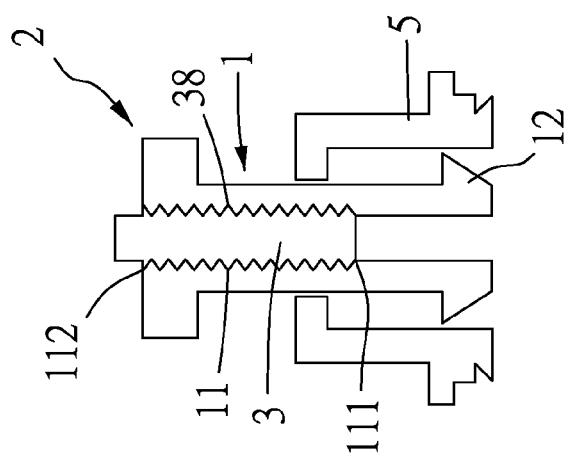
Figure 15A:
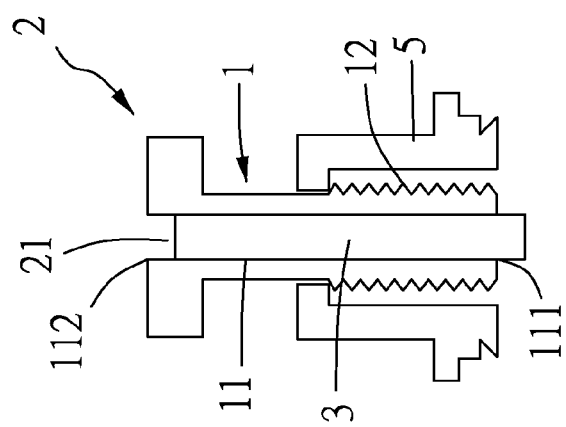
Figure 15F:
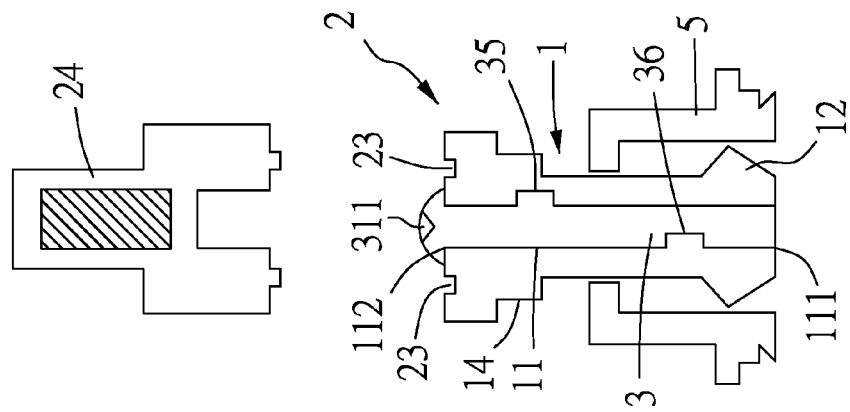
Figure 15E:
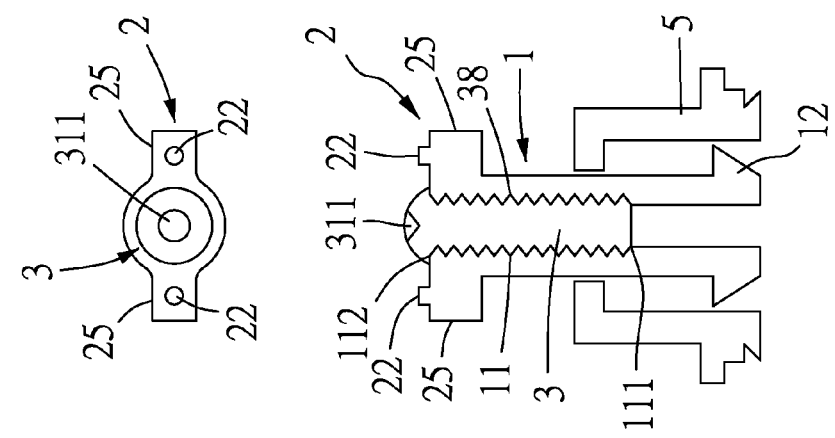
Figure 15D:
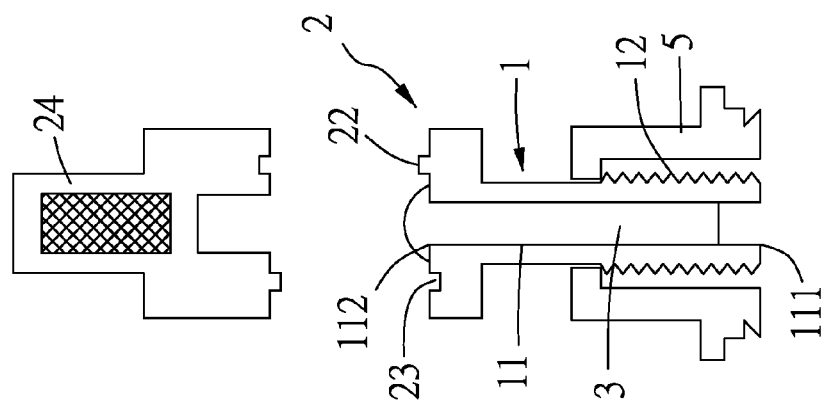

As shown in FIGS. 13a to 13c, FIGS. 14a to 14c and FIGS. 15a to 15f, the variants of the light-permeable fixing component according to the third embodiment of the present invention shown in FIGS. 3a to 3d can respectively further include a light-permeable body 3 mounted at different positions by different ways, including but not limited to insert injection, press-in, engagement, snap-engagement, thermal fusion, screwing or adhesion. FIGS. 13a to 13c show the light-permeable body 3 is mounted at the light-out opening 112; FIGS. 14a to 14c show the light-permeable body 3 is mounted in the receiving channel 11; FIGS. 15b and 15d to 15f show the light-permeable body 3 is mounted in the receiving channel 11 with an end protruded from the light-out opening 112; and FIGS. 15a and 15c show the light-permeable body 3 is mounted in the receiving channel 11 with an end protruded from the light-in opening 111. The light-permeable body 3 can also be mounted in the receiving channel 11 with two opposite ends protruded from the light-in opening 111 and the light-out opening 112, which is not shown in the third embodiment but similar to the case shown in FIG. 12a. With these arrangements, light beams emitted by a light source and passing through the receiving channel 11 and the fixed head portion 2 via the light-in opening 111 can be transferred and refracted by the light-permeable body 3 to further increase the luminous area visible on the light-permeable fixing component. In the case the light-permeable body 3 is to be adhered to the light-permeable fixing component, an adhesive agent can be first sprayed or coated on areas of the light-permeable body 3 that are to be adhered to the light-out opening 112 as shown in FIGS. 13a to 13c; or on areas of the light-permeable body 3 that are to be adhered to the receiving channel 11 as shown in FIGS. 14a, 15a and 15d. Alternatively, the adhesive agent can be first sprayed or coated on areas outside the light-out opening 112 for adhering the light-permeable body 3 thereto, as shown in FIGS. 13a to 13c; or the adhesive agent can be first sprayed or coated on areas in the receiving channel 11 that are to contact with the light-permeable body 3, as shown in FIGS. 14a, 15a and 15d. In the case the light-permeable body 3 is mounted in the receiving channel 11, with or without protruding from the light-in opening 111 and/or the light-out opening 112, the light-permeable body 3 can be provided with a light source. In this case, the luminous areas visible on the light-permeable fixing component can also be expanded without the need of providing an additional light source outside the receiving channel 11.

Please refer to FIGS. 15e and 15f. In the third embodiment of the present invention, the light-permeable body 3 can be mounted in the receiving channel 11 with an end protruded from the light-out opening 112. In this case, the end of the light-permeable body 3 that is protruded from the light-out opening 112 can be further provided on a top with a conical recess 311. Whereby, light beams passing through the conical recess 311 can be gathered and refracted by the conical recess 311.

The conical recess 311 formed on the protruded end of the light-permeable body 3, as shown in FIGS. 15e and 15f, has an opening angle preferably smaller than 180 degrees, and more preferably larger than 20 degrees and smaller than 120 degrees.

Please refer to FIGS. 3b and 15e. In the light-permeable fixing component according to the third embodiment of the present invention, the fixed head portion 2 thereof can be further provided with a wing-like structure 25, which makes it easier to turn the light-permeable fixing component at the fixed head portion 2.

As shown in FIGS. 3b and 15f, the light-permeable fixing component in the third embodiment can further include a neck portion 14 between the fixed head portion 2 and the fixed body 1. The neck portion 14 has a cross sectional area smaller than that of the fixed head portion 2 and larger than that of the fixed body 1.

As shown in FIGS. 3a to 3c and FIGS. 15d to 15f, the fixed head portion 2 of the light-permeable fixing component according to the third embodiment of the present invention can be further provided on the top side around the light-out opening 112 or the light-permeable body 3 with a plurality of ribs 22, or a plurality of grooves 23, or a combination of at least one rib 22 and at least one groove 23. With these arrangements, the light-permeable fixing component can be turned and removed from the workpieces with a spanner 24 that can correspondingly engage with the ribs 22 and/or the grooves 23.

Figure 17C:
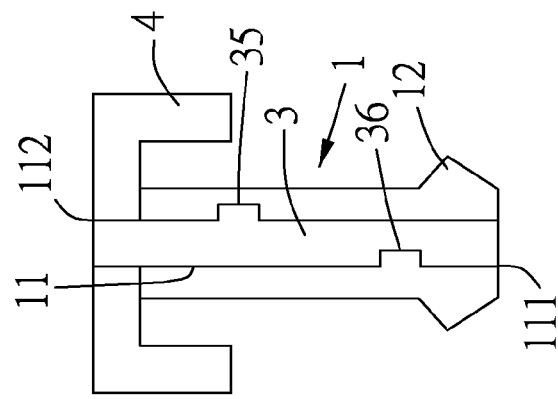
FIGS. 17a to 17c are longitudinal sectional views showing the variants of the light-permeable fixing component according to the fourth embodiment of the present invention can respectively further include a light-permeable body mounted in a receiving channel thereof.
Figure 17B:
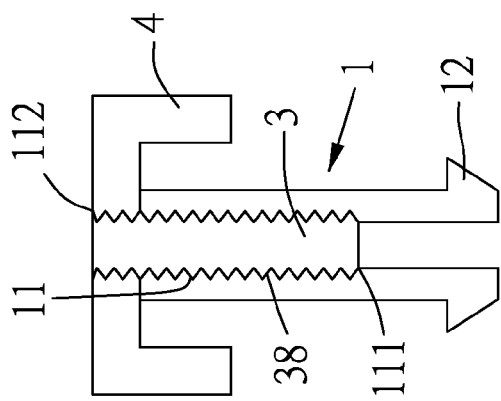
Figure 17A:
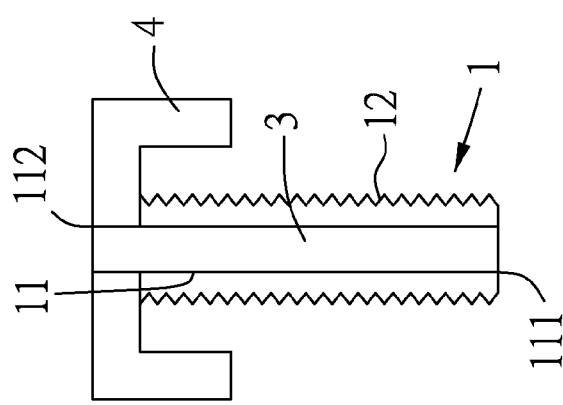
Figure 18C:
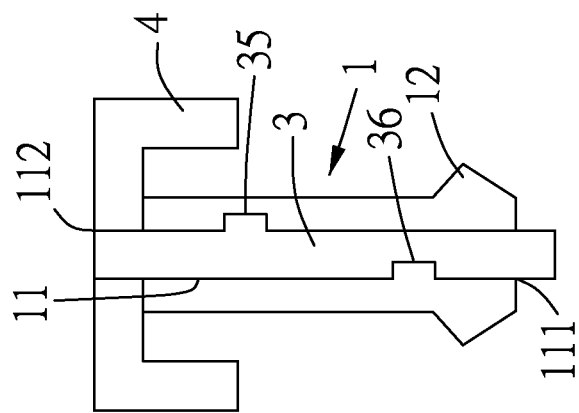
FIGS. 18a to 18c are longitudinal sectional views showing the variants of the light-permeable fixing component according to the fourth embodiment of the present invention can respectively further include a light-permeable body mounted in a receiving channel thereof to protrude from one or both ends of the receiving channel.
Figure 18B:
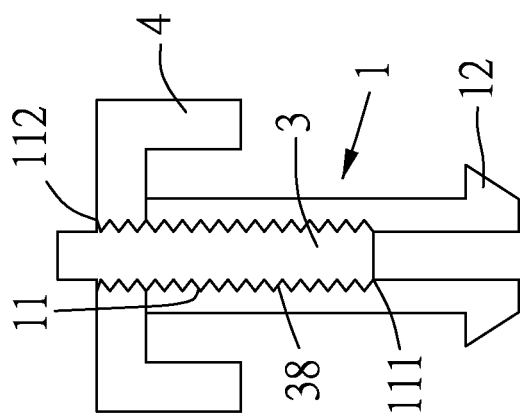
Figure 18A:
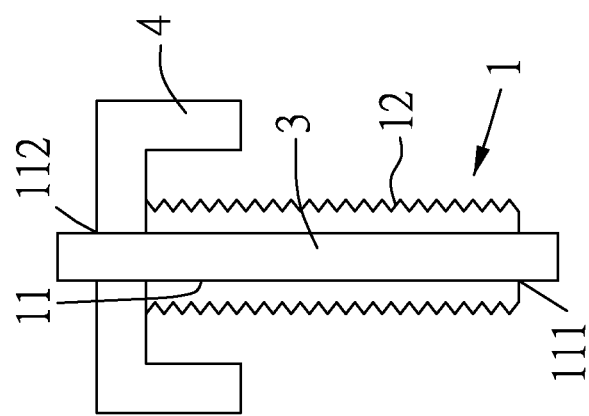

As shown in FIGS. 16a to 16c, FIGS. 17a to 17c and FIGS. 18a to 18c, the variants of the light-permeable fixing component according to the fourth embodiment of the present invention shown in FIGS. 4a to 4c can respectively further include a light-permeable body 3 mounted at different positions by different ways, including but not limited to insert injection, press-in, engagement, snap-engagement, thermal fusion, screwing or adhesion. FIGS. 16a to 16c show the light-permeable body 3 is mounted at the light-out opening 112; FIGS. 17a to 17c show the light-permeable body 3 is mounted in the receiving channel 11; FIG. 18a shows the light-permeable body 3 is mounted in the receiving channel 11 with two opposite ends protruded from the light-in opening 111 and the light-out opening 112; FIG. 18b shows the light-permeable body 3 is mounted in the receiving channel 11 with an end protruded from the light-out opening 112; and FIG. 18c shows the light-permeable body 3 is mounted in the receiving channel 11 with an end protruded from the light-in opening 111. With these arrangements, light beams emitted by a light source and passing through the receiving channel 11 and the cap 4 via the light-in opening 111 can be transferred and refracted by the light-permeable body 3 to further increase the luminous area visible on the light-permeable fixing component. In the case the light-permeable body 3 is to be adhered to the light-permeable fixing component, an adhesive agent can be first sprayed or coated on areas of the light-permeable body 3 that are to be adhered to the light-out opening 112 as shown in FIGS. 16a to 16c; or on areas of the light-permeable body 3 that are to be adhered to the receiving channel 11 as shown in FIGS. 17a and 18a. Alternatively, the adhesive agent can be first sprayed or coated on areas outside the light-out opening 112 for adhering the light-permeable body 3 thereto, as shown in FIGS. 16b to 16c; or the adhesive agent can be first sprayed or coated on areas in the receiving channel 11 that are to contact with the light-permeable body 3, as shown in FIGS. 17a and 18a.

Figure 19C:
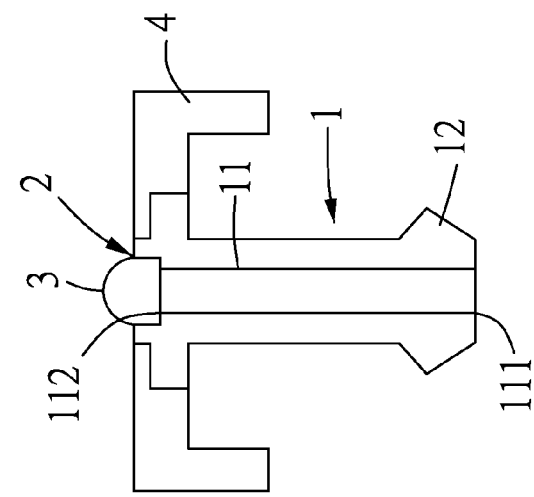
FIGS. 19a to 19c are longitudinal sectional views showing the variants of the light-permeable fixing component according to the fifth embodiment of the present invention can respectively further include a light-permeable body mounted on a head end thereof.
Figure 19B:
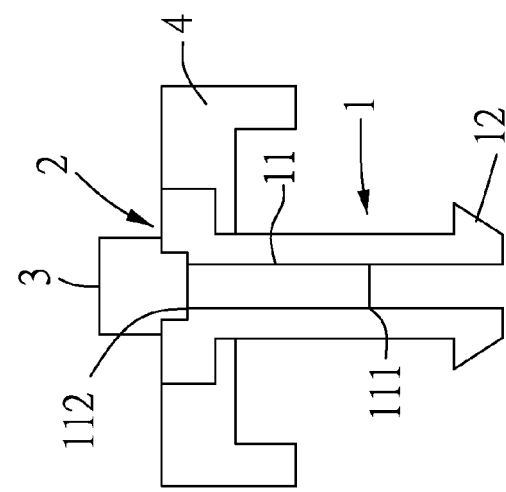
Figure 19A:
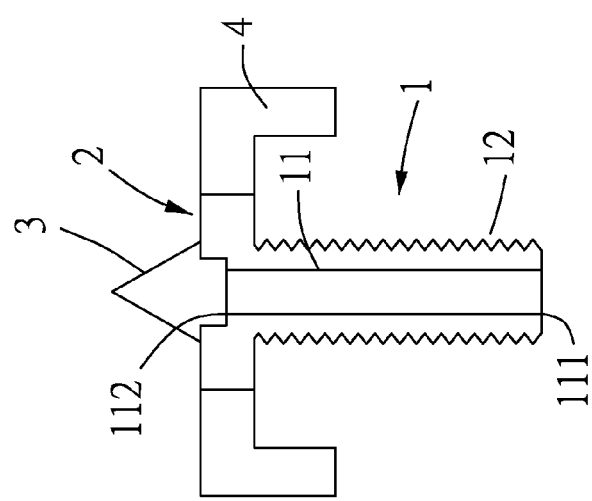
Figure 20C:
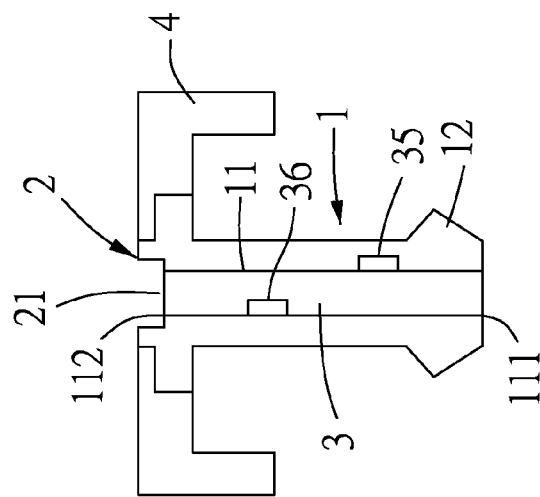
FIGS. 20a to 20c are longitudinal sectional views showing the variants of the light-permeable fixing component according to the fifth embodiment of the present invention can respectively further include a light-permeable body mounted in a receiving channel thereof.
Figure 20B:
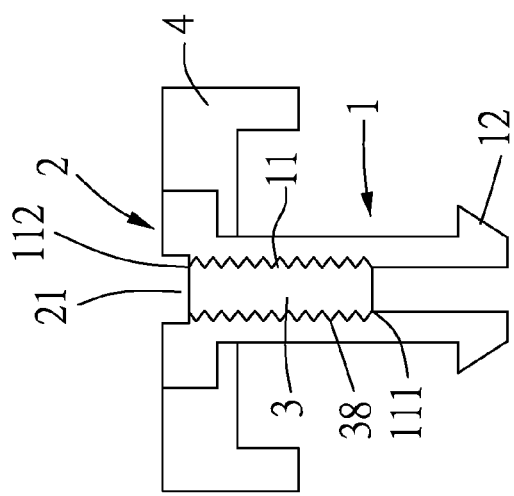
Figure 20A:
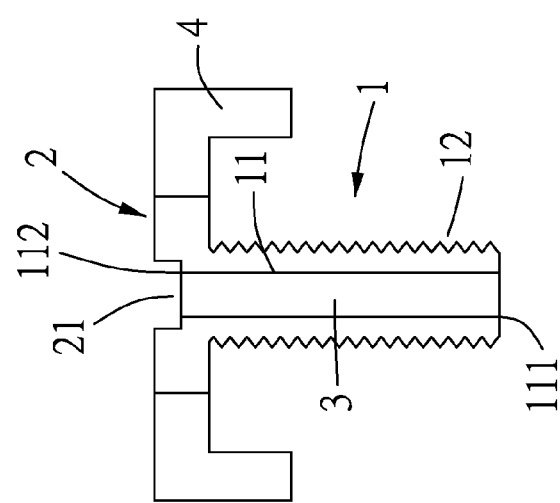
Figure 21A:
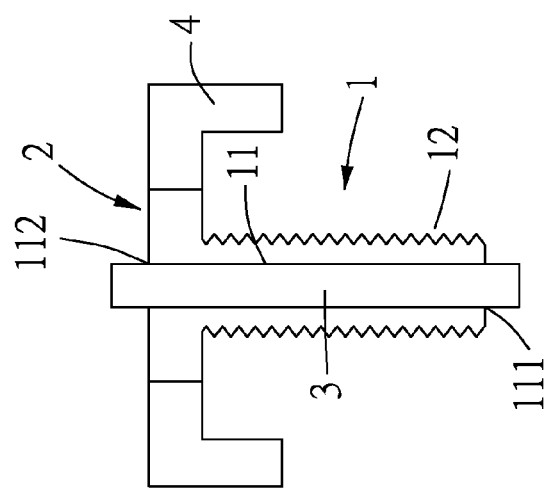
FIGS. 21a to 21c are longitudinal sectional views showing the variants of the light-permeable fixing component according to the fifth embodiment of the present invention can respectively further include a light-permeable body mounted in a receiving channel thereof to protrude from one or both ends of the receiving channel.
Figure 21B:
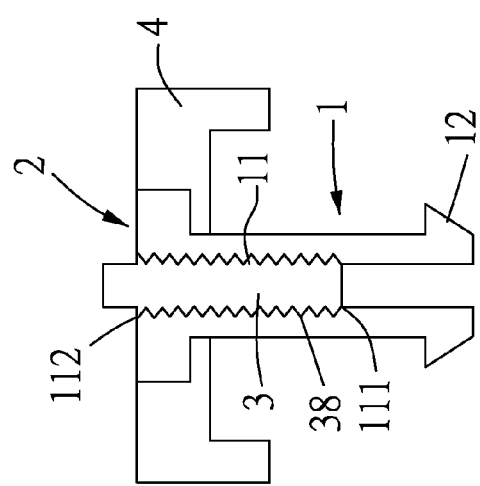
Figure 21C:
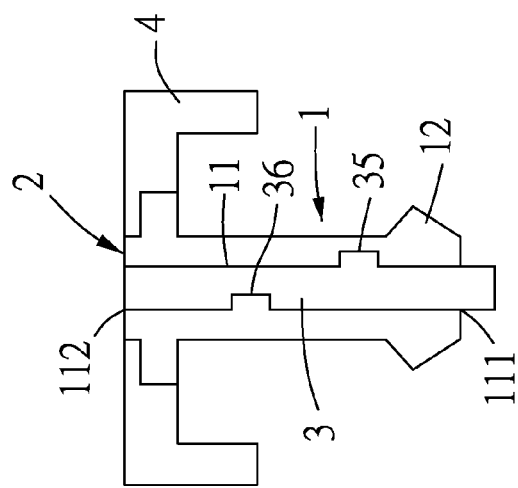

As shown in FIGS. 19a to 19c, FIGS. 20a to 20c and FIGS. 21a to 21c, the variants of the light-permeable fixing component according to the fifth embodiment of the present invention shown in FIGS. 5a to 5c can respectively further include a light-permeable body 3 mounted at different positions by different ways, including but not limited to insert injection, press-in, engagement, snap-engagement, thermal fusion, screwing or adhesion. FIGS. 19a to 19c show the light-permeable body 3 is mounted at the light-out opening 112; FIGS. 20a to 20c show the light-permeable body 3 is mounted in the receiving channel 11; FIG. 21a shows the light-permeable body 3 is mounted in the receiving channel 11 with two opposite ends protruded from the light-in opening 111 and the light-out opening 112; FIG. 21b shows the light-permeable body 3 is mounted in the receiving channel 11 with an end protruded from the light-out opening 112; and FIG. 21c shows the light-permeable body 3 is mounted in the receiving channel 11 with an end protruded from the light-in opening 111. With these arrangements, light beams emitted by a light source and passing through the receiving channel 11 and the fixed head portion 2 via the light-in opening 111 can be transferred and refracted by the light-permeable body 3 to further increase the luminous area visible on the light-permeable fixing component. In the case the light-permeable body 3 is to be adhered to the light-permeable fixing component, an adhesive agent can be first sprayed or coated on areas of the light-permeable body 3 that are to be adhered to the light-out opening 112 as shown in FIGS. 19a to 19c; or on areas of the light-permeable body 3 that are to be adhered to the receiving channel 11 as shown in FIGS. 20a and 21a. Alternatively, the adhesive agent can be first sprayed or coated on areas outside the light-out opening 112 for adhering the light-permeable body 3 thereto, as shown in FIGS. 19a to 19c; or the adhesive agent can be first sprayed or coated on areas in the receiving channel 11 that are to contact with the light-permeable body 3, as shown in FIGS. 20a and 21a.

Figure 22C:
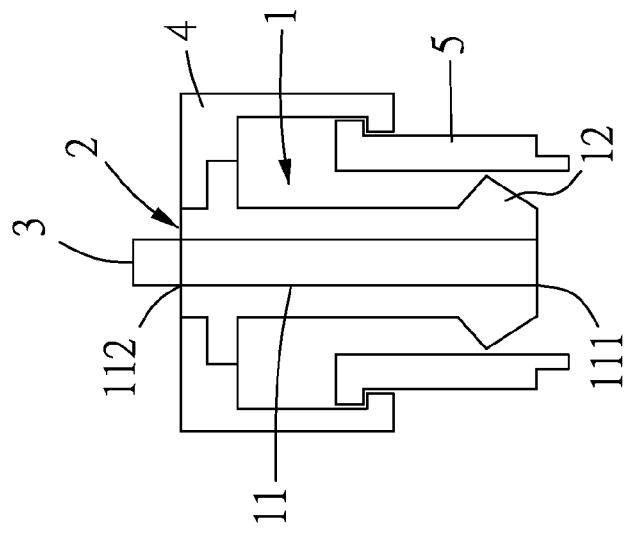
FIGS. 22a to 22c are longitudinal sectional views showing the variants of the light-permeable fixing component according to the sixth embodiment of the present invention can respectively further include a light-permeable body mounted on a head end thereof.
Figure 22B:
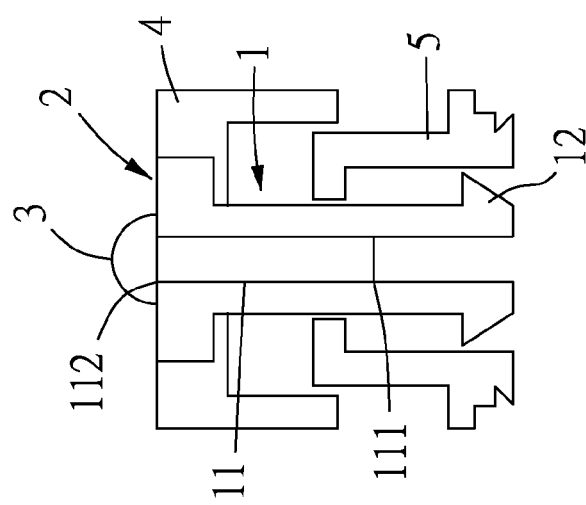
Figure 22A:
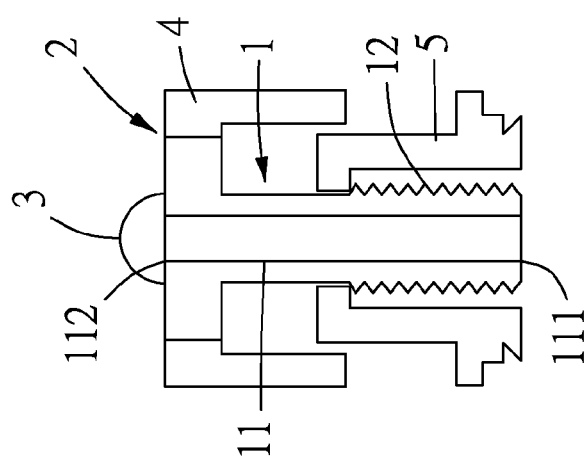
Figure 23C:
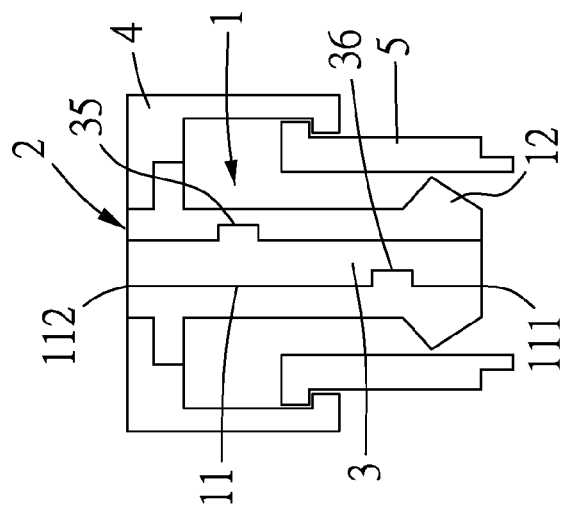
FIGS. 23a to 23c are longitudinal sectional views showing the variants of the light-permeable fixing component according to the sixth embodiment of the present invention can respectively further include a light-permeable body mounted in a receiving channel thereof.
Figure 23B:
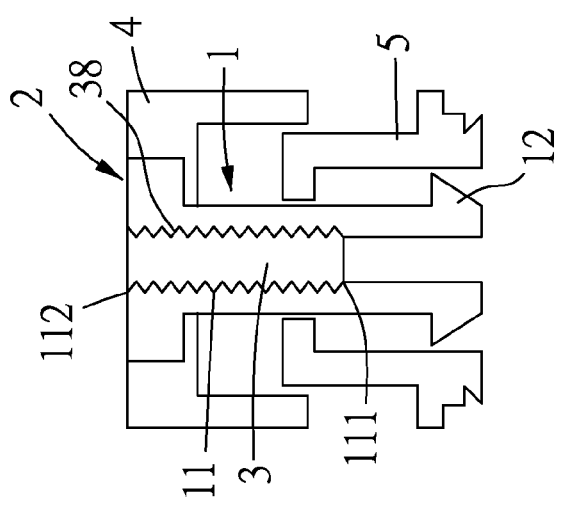
Figure 23A:
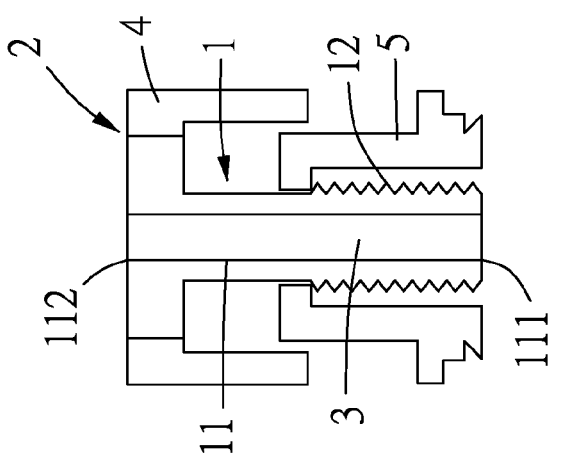
Figure 24C:
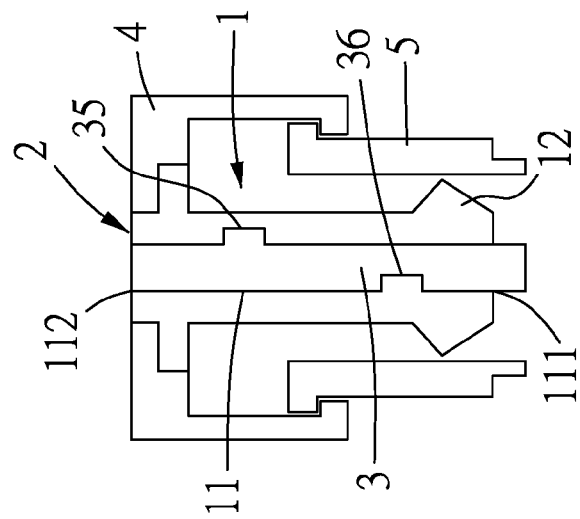
FIGS. 24a to 24c are longitudinal sectional views showing the variants of the light-permeable fixing component according to the sixth embodiment of the present invention can respectively further include a light-permeable body mounted in a receiving channel thereof to protrude from one or both ends of the receiving channel.
Figure 24B:
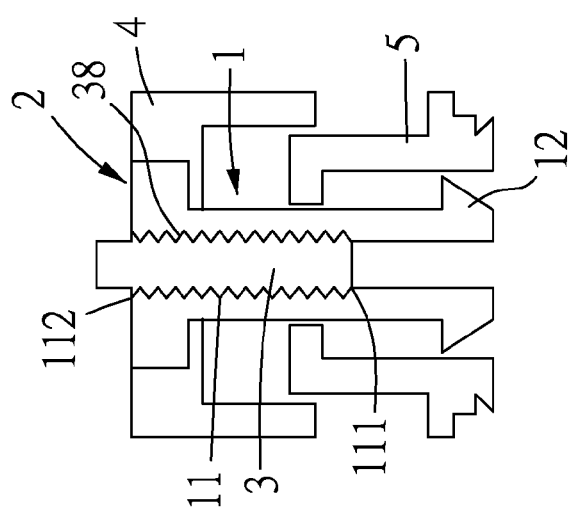
Figure 24A:
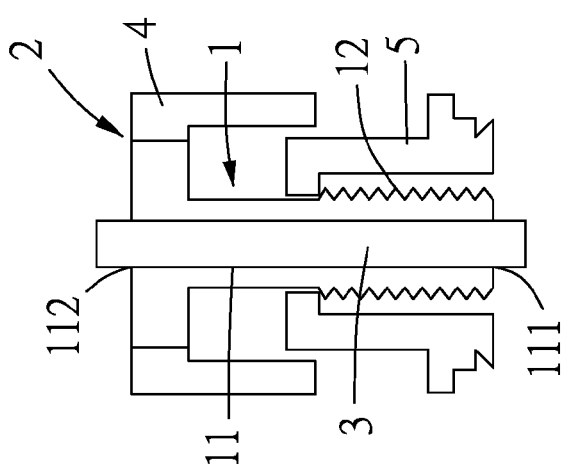

As shown in FIGS. 22a to 22c, FIGS. 23a to 23c and FIGS. 24a to 24c, the variants of the light-permeable fixing component according to the sixth embodiment of the present invention shown in FIGS. 6a to 6c can respectively further include a light-permeable body 3 mounted at different positions by different ways, including but not limited to insert injection, press-in, engagement, snap-engagement, thermal fusion, screwing or adhesion. FIGS. 22a to 22c show the light-permeable body 3 is mounted at the light-out opening 112; FIGS. 23a to 23c show the light-permeable body 3 is mounted in the receiving channel 11; FIG. 24a shows the light-permeable body 3 is mounted in the receiving channel 11 with two opposite ends protruded from the light-in opening 111 and the light-out opening 112; FIG. 24b shows the light-permeable body 3 is mounted in the receiving channel 11 with an end protruded from the light-out opening 112; and FIG. 24c shows the light-permeable body 3 is mounted in the receiving channel 11 with an end protruded from the light-in opening 111. With these arrangements, light beams emitted by a light source and passing through the receiving channel 11 and the fixed head portion 2 via the light-in opening 111 can be transferred and refracted by the light-permeable body 3 to further increase the luminous area visible on the light-permeable fixing component. In the case the light-permeable body 3 is to be adhered to the light-permeable fixing component, an adhesive agent can be first sprayed or coated on areas of the light-permeable body 3 that are to be adhered to the light-out opening 112 as shown in FIGS. 22a to 22c; or on the areas of the light-permeable body 3 that are to be adhered to the receiving channel 11 as shown in FIGS. 23a and 24a. Alternatively, the adhesive agent can be first sprayed or coated on areas outside the light-out opening 112 for adhering the light-permeable body 3 thereto, as shown in FIGS. 22a to 22c; or the adhesive agent can be first sprayed or coated on areas in the receiving channel 11 that are to contact with the light-permeable body 3, as shown in FIGS. 23a and 24a.

Figure 25C:
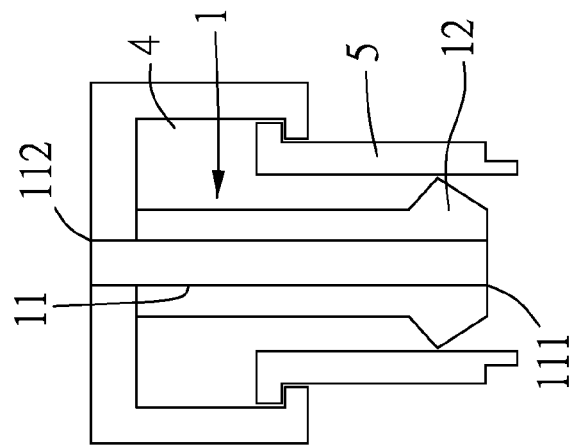
FIGS. 25a to 25c are longitudinal sectional views showing the variants of the light-permeable fixing component according to the fourth embodiment of the present invention can respectively further include a sleeve member.
Figure 25B:
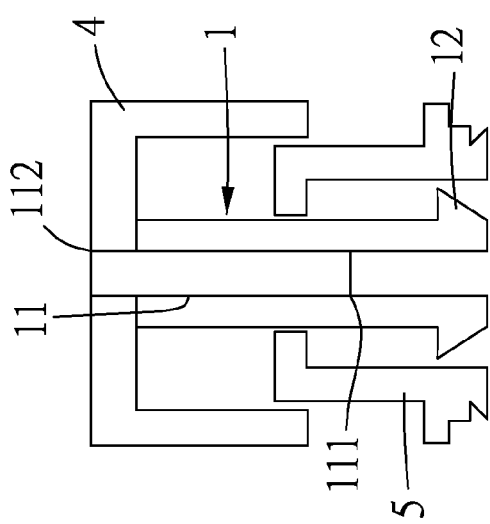
Figure 25A:
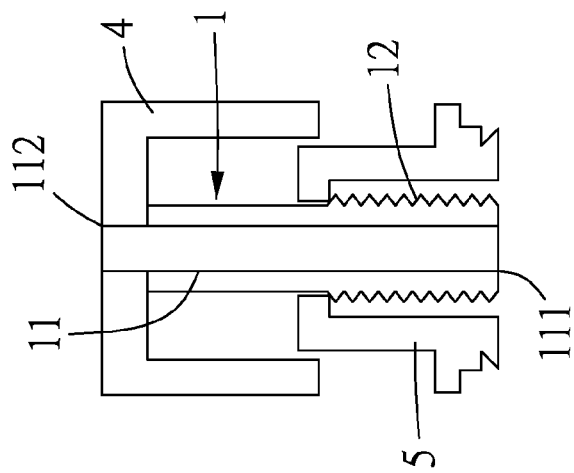

As shown in FIGS. 25a to 25c, the variants of the light-permeable fixing component according to the fourth embodiment of the present invention shown in FIGS. 4a to 4c can respectively further include a sleeve 5, which is movably connected to the fixed body 1, as shown in FIGS. 25a and 25b, or to the cap 4, as shown in FIG. 25c. In the case the sleeve 5 is to be movably connected to the cap 4, the cap 4 is configured to have a lower end formed into a radially inward protruded flange portion and the sleeve 5 is configured to have an upper end formed into a radially outward protruded flange portion, and the upper flange portion of the sleeve 5 is movably rested on the lower flange portion of the cap 4. When using the light-permeable fixing component shown in FIGS. 25a to 25c to fasten two workpieces together, first locate the sleeve 5 on a first one of the two workpieces and then drive the fixed body 1 into the second workpiece.

The variants of the light-permeable fixing component according to the fourth embodiment of the present invention shown in FIGS. 16a to 16c, FIGS. 17a to 17c and FIGS. 18a to 18c can respectively further include a sleeve 5, as shown in FIGS. 26a to 26c, FIGS. 27a to 27c and FIGS. 28a to 28c. The sleeve 5 can be movably connected to the fixed body 1 or the cap 4. In the case the sleeve 5 is to be movably connected to the cap 4, the cap 4 is configured to have a lower end formed into a radially inward protruded flange portion and the sleeve 5 is configured to have an upper end formed into a radially outward protruded flange portion, and the upper flange portion of the sleeve 5 is movably rested on the lower flange portion of the cap 4. When using the light-permeable fixing component shown in FIGS. 26a to 26c, FIGS. 27a to 27c and FIGS. 28a to 28c to fasten two workpieces together, first locate the sleeve 5 on a first one of the two workpieces and then drive the fixed body 1 into the second workpiece.

Figure 29C:
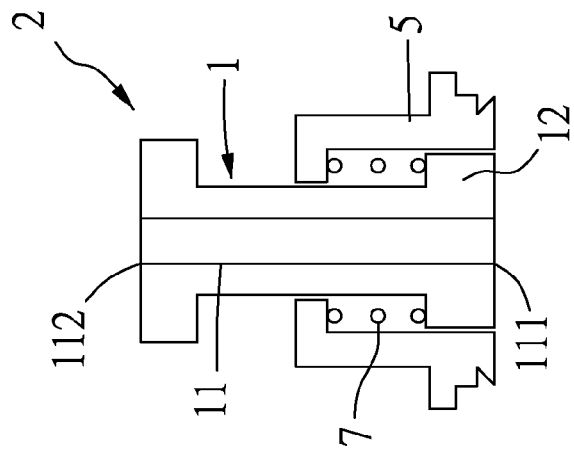
FIGS. 29*a* to 29*c* are longitudinal sectional views showing the variants of the light-permeable fixing component according to the third embodiment of the present invention can respectively further include an elastic member.
Figure 29B:
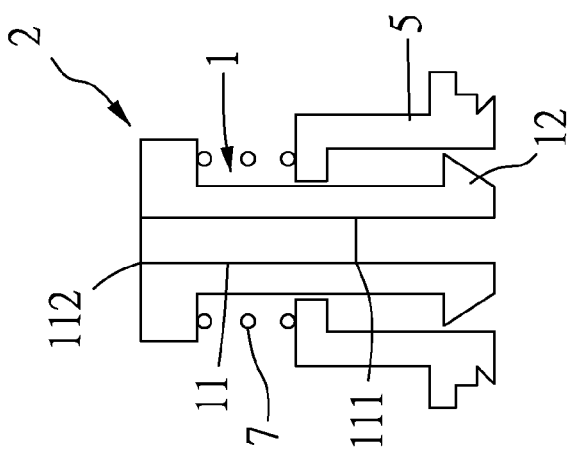
Figure 29A:
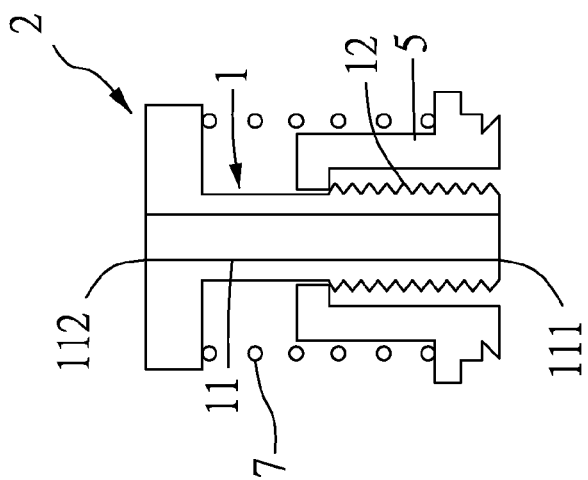

The variants of the light-permeable fixing component according to the third embodiment of the present invention shown in FIGS. 3a to 3d can respectively further include an elastic member 7, as shown in FIGS. 29a to 29c. The elastic member 7 can be located around the fixed body 1 with an end pressed against the fixed head portion 2 and another end against the sleeve 5, as shown in FIGS. 29a and 29b, such that the elastic member 7 normally elastically brings the fixed body 1 to a lifted position when the light-permeable fixing component is not in use. Alternatively, the elastic member 7 can be located around the fixed body 1 with an end pressed against the sleeve 5 and another end against the fixing portion 12, as shown in FIG. 29c.

Figure 30C:
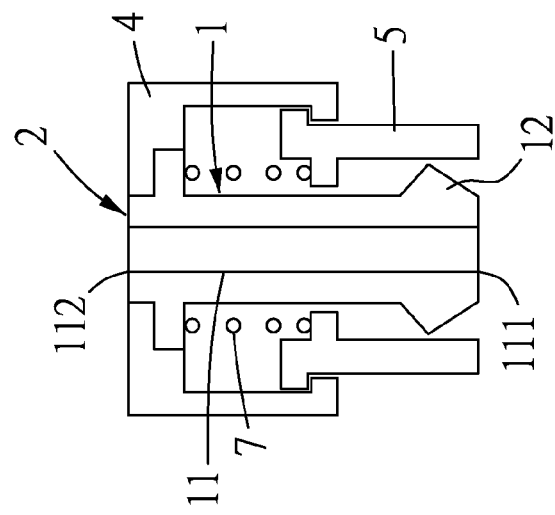
FIGS. 30*a* to 30*c* are longitudinal sectional views showing the variants of the light-permeable fixing component according to the third embodiment of the present invention can respectively further include an elastic member and a cap.
Figure 30B:
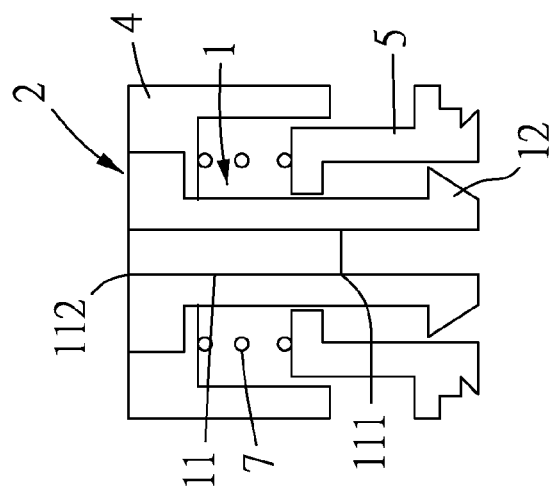
Figure 30A:
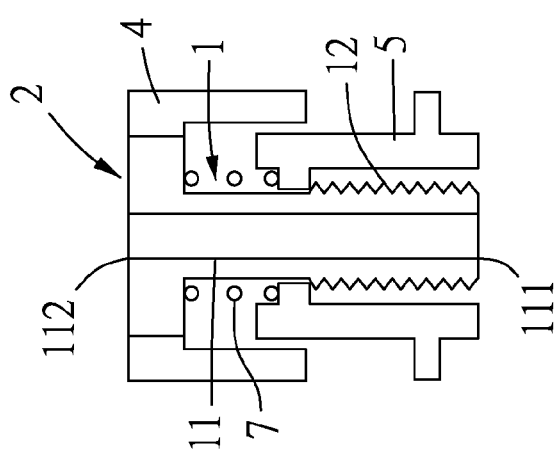

The variants of the light-permeable fixing component according to the third embodiment of the present invention shown in FIGS. 3a to 3d can respectively further include a cap 4 to form the light-permeable fixing component according to the sixth embodiment of the present invention shown in FIGS. 6a to 6c; and the variants of the light-permeable fixing component shown in FIGS. 6a to 6c can respectively further include an elastic member 7, as shown in FIGS. 30a to 30c. The elastic member 7 is located around the fixed body 1 with an end pressed against the fixed head portion 2 or the cap 4 and another end against the sleeve 5, such that the elastic member 7 normally elastically brings the fixed body 1 to a lifted position when the light-permeable fixing component is not in use.

Figure 31A:
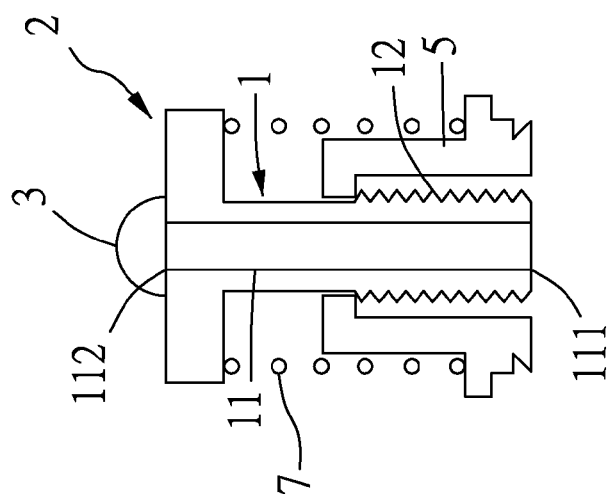
FIGS. 31*a* to 31*c* are longitudinal sectional views showing the variants of the light-permeable fixing component according to the third embodiment of the present invention can respectively further include an elastic member and a light-permeable body, with the light-permeable body being mounted on a head end of the light-permeable fixing component.
Figure 31B:
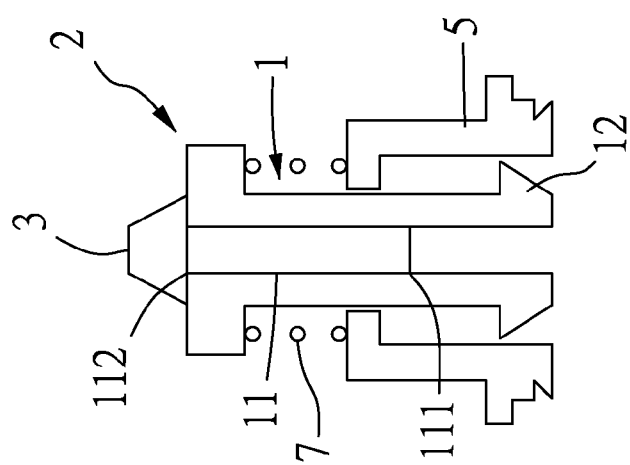
Figure 31C:
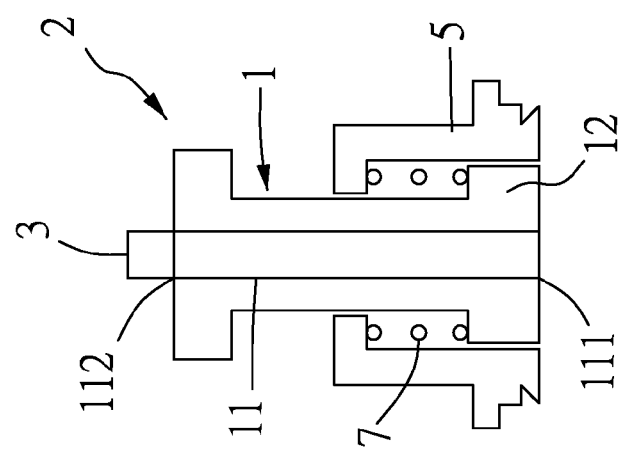

The variants of the light-permeable fixing component according to the third embodiment of the present invention shown in FIGS. 13a to 13c can respectively further include an elastic member 7, as shown in FIGS. 31a to 31b. The elastic member 7 is located around the fixed body 1 with an end pressed against the fixed head portion 2 and another end against the sleeve 5, such that the elastic member 7 normally elastically brings the fixed body 1 to a lifted position when the light-permeable fixing component is not in use.

Figure 32C:
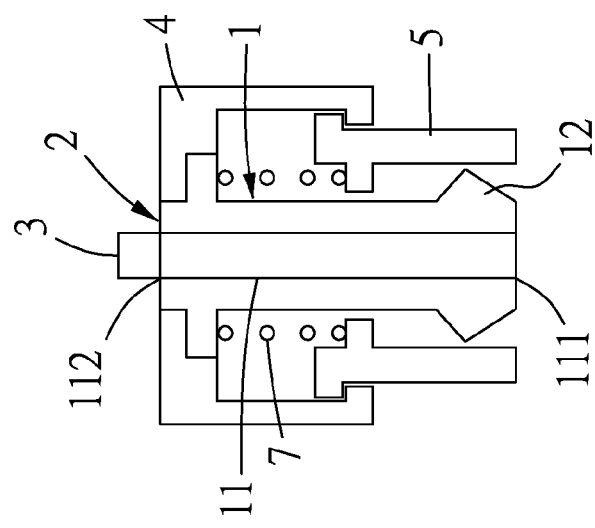
FIGS. 32*a* to 32*c* are longitudinal sectional views showing the variants of the light-permeable fixing component according to the third embodiment of the present invention can respectively further include an elastic member, a light-permeable body and a sleeve member, with the light-permeable body being mounted on a head end of the light-permeable fixing component.
Figure 32B:
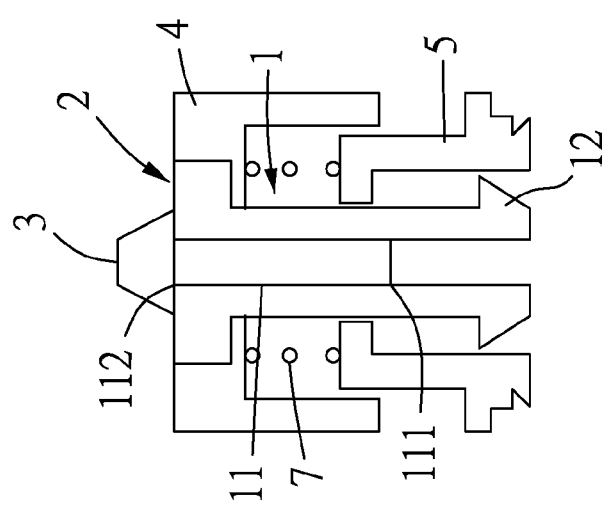
Figure 32A:
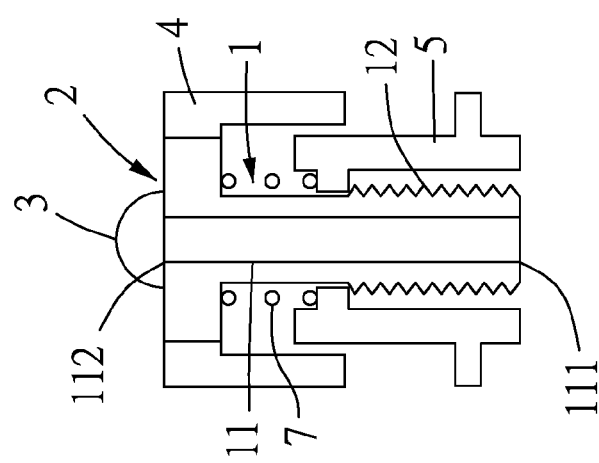

The variants of the light-permeable fixing component according to the third embodiment of the present invention shown in FIGS. 3a to 3d can respectively further include a light-permeable body 3 and a cap 4 to form the light-permeable fixing component according to the sixth embodiment of the present invention shown in FIGS. 22a to 22c; and the variants of the light-permeable fixing component shown in FIGS. 22a to 22c can respectively further include an elastic member 7, as shown in FIGS. 32a to 32c. The elastic member 7 is located around the fixed body 1 with an end pressed against the fixed head portion 2 or the cap 4 and another end against the sleeve 5, such that the elastic member 7 normally elastically brings the fixed body 1 to a lifted position when the light-permeable fixing component is not in use.

Figure 33A:
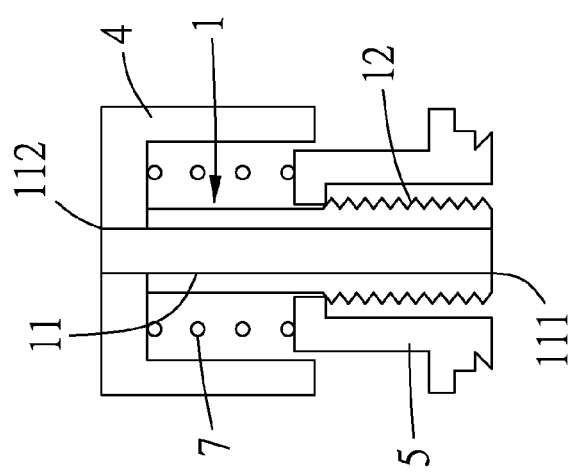
FIGS. 33*a* to 33*c* are longitudinal sectional views showing the variants of the light-permeable fixing component according to the first embodiment of the present invention can respectively further include a cap, a sleeve member and an elastic member.
Figure 33B:
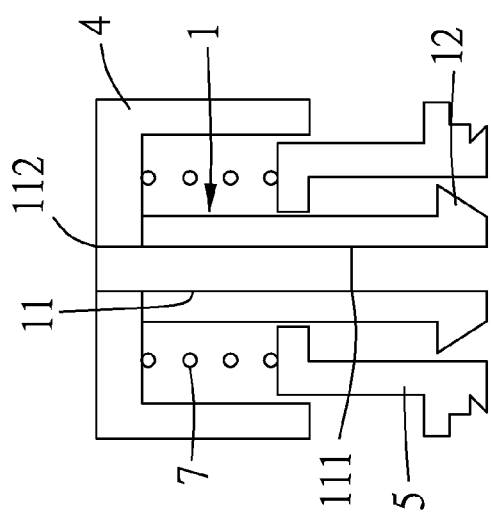
Figure 33C:
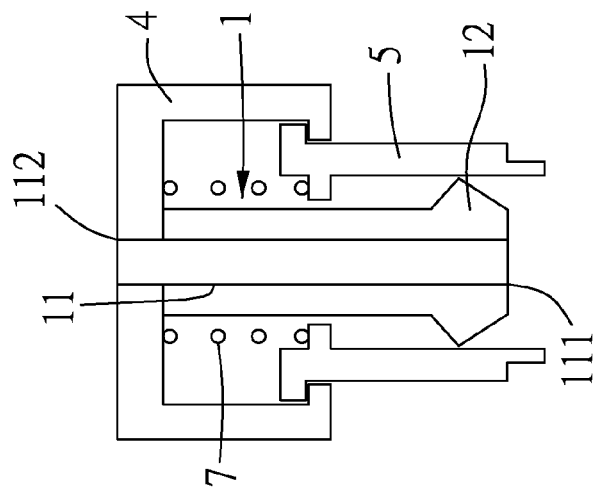

The variants of the light-permeable fixing component according to the first embodiment of the present invention shown in FIGS. 1a to 1d can respectively further include a cap 4 and a sleeve 5 to form the light-permeable fixing component according to the fourth embodiment of the present invention shown in FIGS. 25a to 25c; and the variants of the light-permeable fixing component shown in FIGS. 25a to 25c can respectively further include an elastic member 7, as shown in FIGS. 33a to 33c. The elastic member 7 is located around the fixed body 1 with an end pressed against the cap 4 and another end against the sleeve 5, such that the elastic member 7 normally elastically brings the fixed body 1 to a lifted position when the light-permeable fixing component is not in use.

Figure 26C:
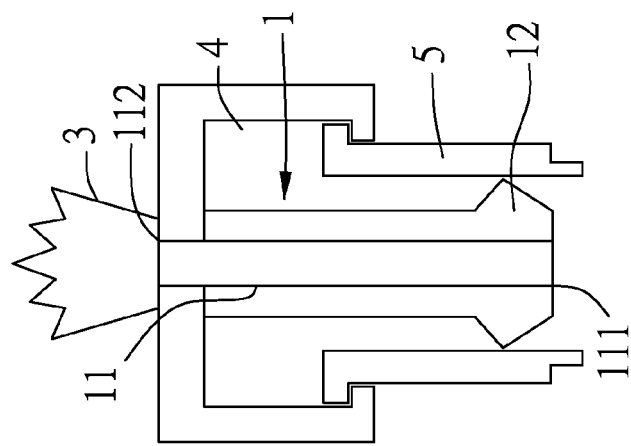
FIGS. 26a to 26c are longitudinal sectional views showing the variants of the light-permeable fixing component according to the fourth embodiment of the present invention can respectively further include a sleeve member and a light-permeable body, with the light-permeable body being mounted on a head end of the light-permeable fixing component.
Figure 26B:
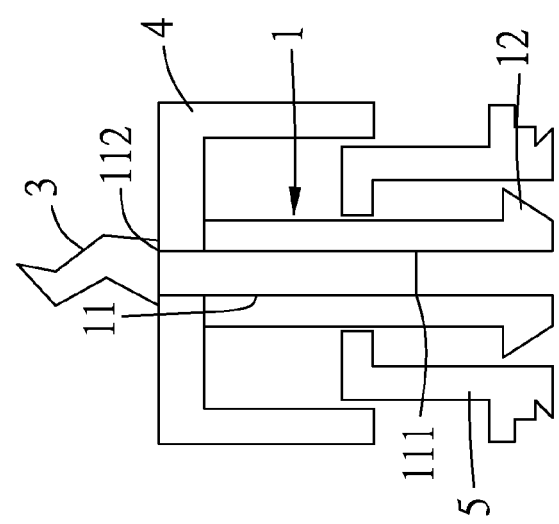
Figure 26A:
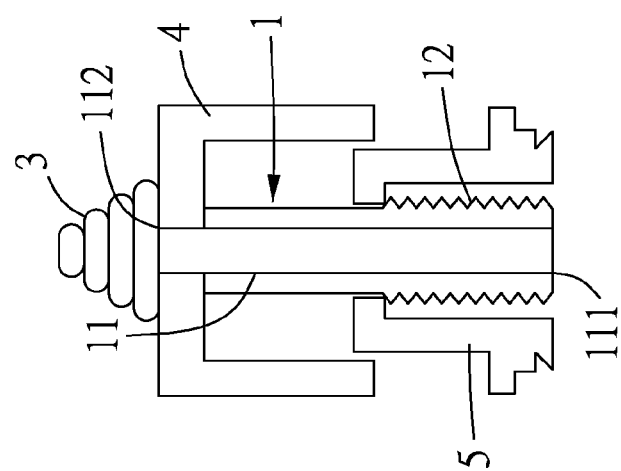
Figure 27A:
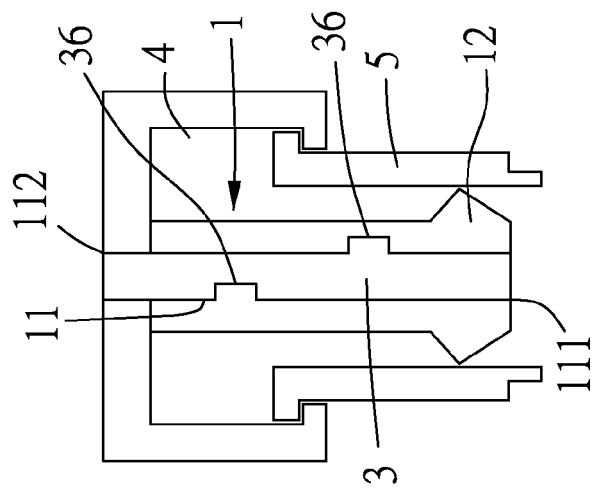
FIGS. 27a to 27c are longitudinal sectional views showing the variants of the light-permeable fixing component according to the fourth embodiment of the present invention can respectively further include a sleeve member and a light-permeable body, with the light-permeable body being mounted in a receiving channel of the light-permeable fixing component.
Figure 27B:
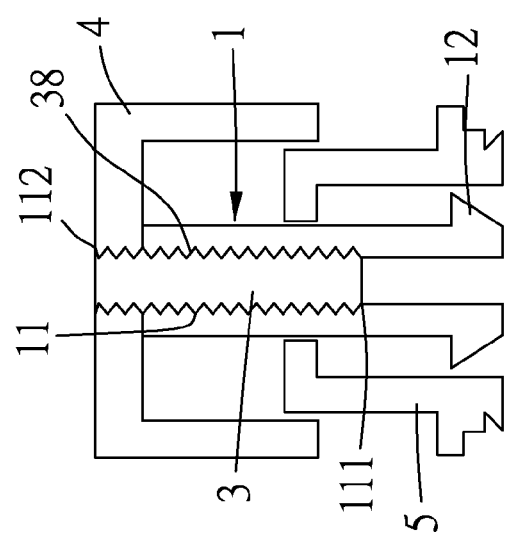
Figure 27C:
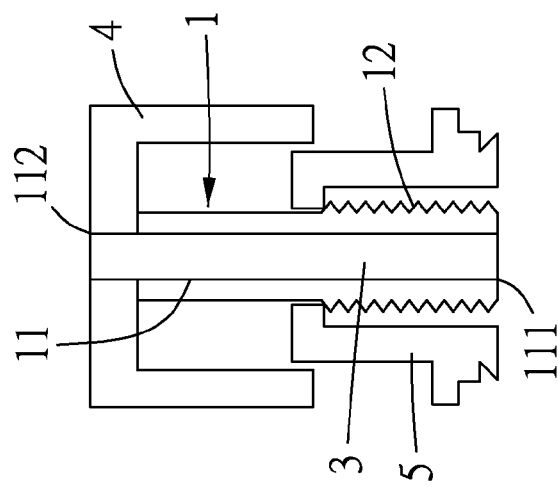
Figure 28C:
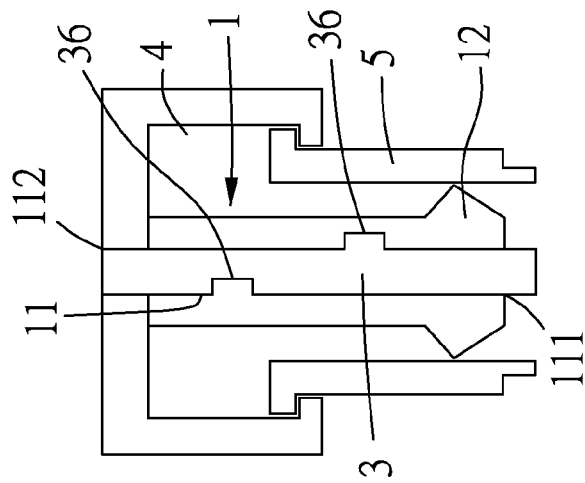
FIGS. 28*a* to 28*c* are longitudinal sectional views showing the variants of the light-permeable fixing component according to the fourth embodiment of the present invention can respectively further include a sleeve member and a light-permeable body, with the light-permeable body being mounted in a receiving channel of the light-permeable fixing component to protrude from one or both ends of the receiving channel.
Figure 28B:
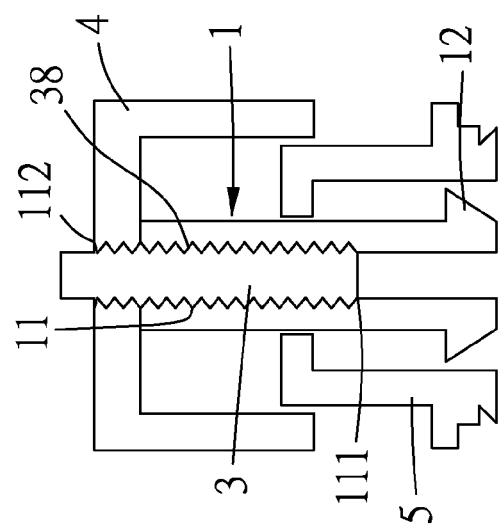
Figure 28A:
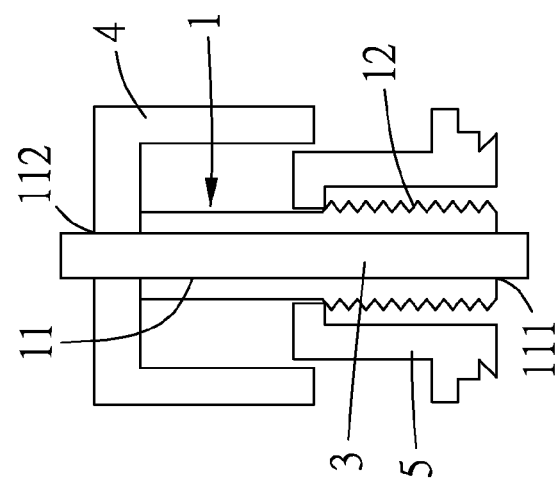

The variants of the light-permeable fixing component according to the first embodiment of the present invention shown in FIGS. 1a to 1d can respectively further include a light-permeable body 3, a cap 4 and a sleeve 5 to form the light-permeable fixing component according to the fourth embodiment of the present invention shown in FIGS. 26a to 26c; and the variants of the light-permeable fixing component shown in FIGS. 26a to 26c can respectively further include an elastic member 7, as shown in FIGS. 34a to 34c. The elastic member 7 is located around the fixed body 1 with an end pressed against the cap 4 and another end against the sleeve 5, such that the elastic member 7 normally elastically brings the fixed body 1 to a lifted position when the light-permeable fixing component is not in use.

Please refer to FIGS. 7a to 7c, FIGS. 10a to 10c and FIGS. 13a to 13c, the light-permeable body 3 mounted at the light-out opening 112 of the light-permeable fixing component of the present invention can be differently shaped. For example, the light-permeable body 3 can be shaped to include a curved top surface 34 as shown in FIGS. 7a, 10a and 13b; or a flat top surface 31, as shown in FIGS. 7b, 7c, 10c, 13a and 13c, with a straight side surface 32 as shown in FIGS. 7b, 7c, 13a and 13c, or a slant side surface 33 as shown in FIGS. 10b and 10c. By giving the light-permeable body 3 different geometrical shapes, light beams passing through the light-permeable body 3 can be refracted and directed to specific areas on the light-permeable body 3.

Alternatively, the light-permeable body 3 mounted at the light-out opening 112 of the light-permeable fixing component of the present invention can have an annular configuration as shown in FIG. 26a, or include projections or recesses as shown in FIGS. 26b and 26c, or include any combination of the above configurations, so that light beams passing through the light-permeable body 3 can be reflected multiple times in the light-permeable body 3 to give the light-permeable fixing component increased brightness.

Alternatively, as shown in FIGS. 7a to 7c through FIGS. 24a to 24c, the light-permeable body 3 for different embodiments of the present invention and the variants thereof can include a protruded portion 35 and a recessed portion 36 (see for example FIGS. 8c, 9c, 11c, 12c, 12f, 13c, 14c, 15c, 15f, 17c, 18c, 20c, 21c, 23c and 24c), a retaining section 37 (see FIGS. 13b), a threaded section 38 (see for example FIGS. 7a, 8b, 9b, 10a, 11b, 12b, 12e, 14b, 15b, 15e, 17b, 18b, 20b, 21b, 23b and 24b), or a bonding section 39 (see FIGS. 7c, 10b and 10c) for holding the light-permeable body 3 to the fixed body 1, the fixed head portion 2 or the cap 4.

According to the present invention, the fixed body 1 for the light-permeable fixing component can be made of a metal material to have enhanced structural strength; and the light-permeable body 3 for the light-permeable fixing component can be made from optical fiber, fibrous material, plastic, glass, quartz, acrylic, rubber, or silicone.

Figure 36:
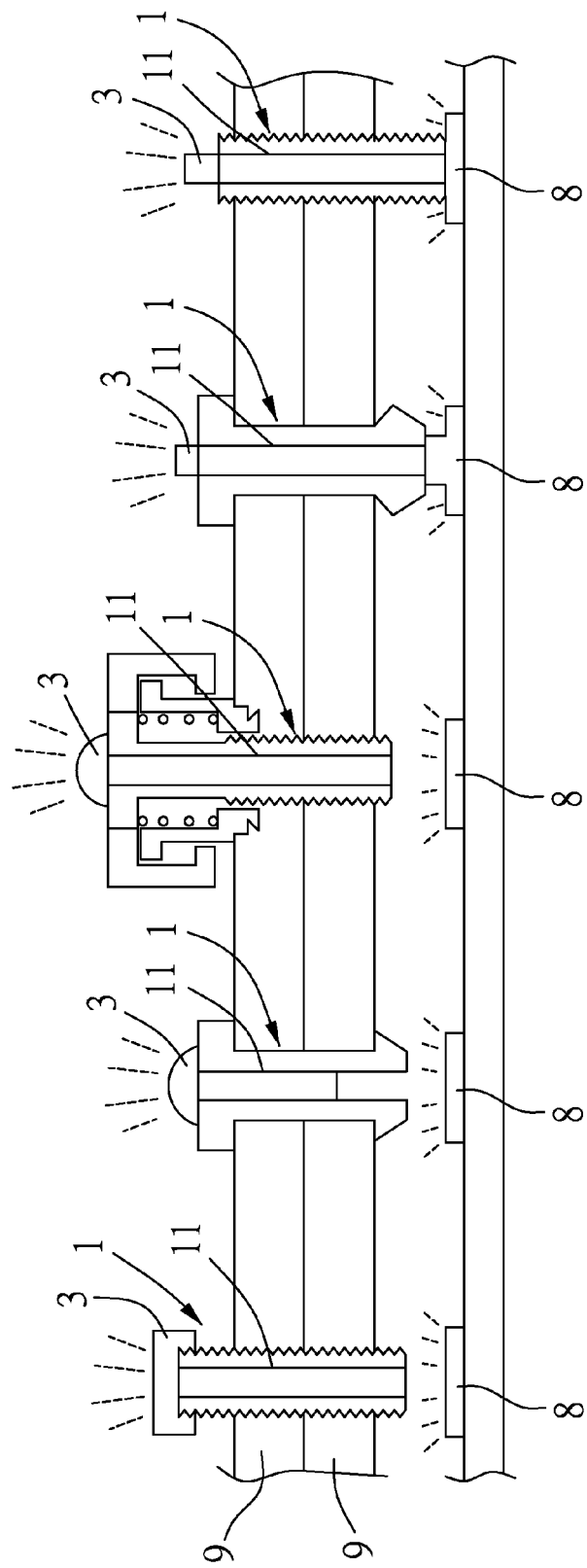
Figure 37:
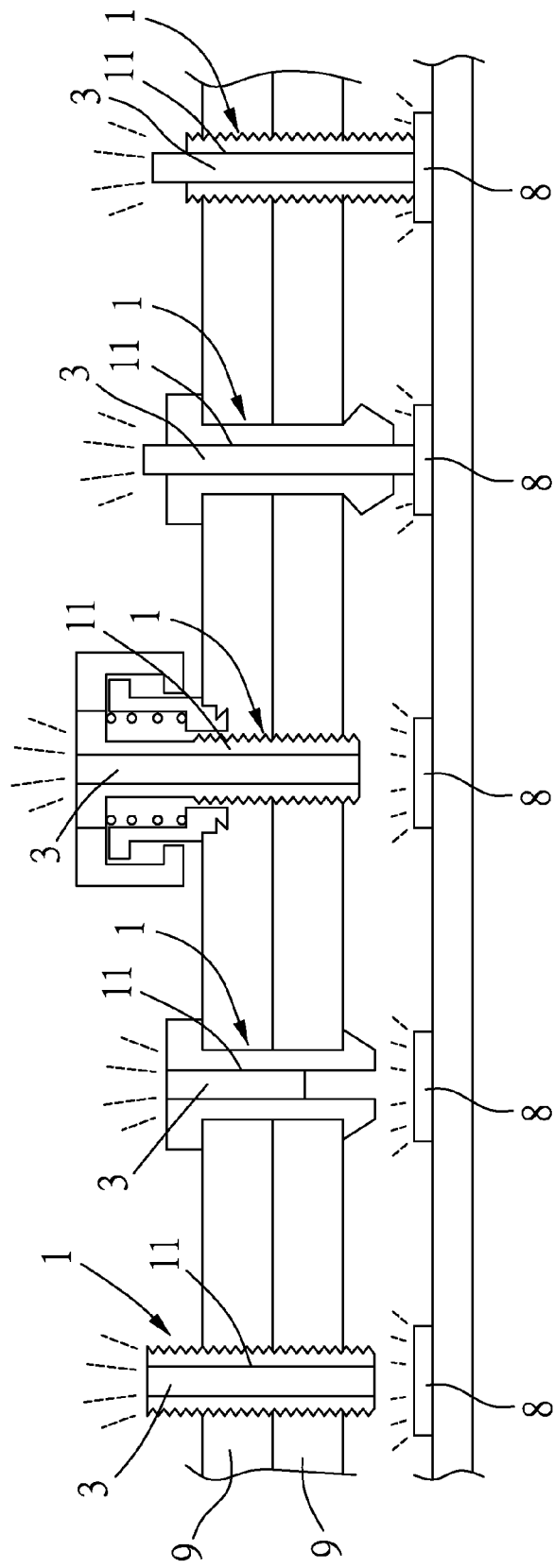

FIGS. 35 to 37 schematically show some examples of application of different embodiments and variants of the light-permeable fixing component of the present invention. As shown, after the light-permeable fixing component fastens two workpieces 9 together, light beams emitted by a light source 8 can be guided by the fixed body 1 alone or by the fixed body 1 and the light-permeable body 3 from the light-in opening to the light-out opening to lighten the light-permeable fixing component. The light source 8 can be a light-emitting diode (LED), a bulb or a fluorescent lamp. Further, the two rightmost light sources 8 in each of FIGS. 35 to 37 are respectively actuated to emit light when being touched by the tail end of the fixed body.

Figure 38C:
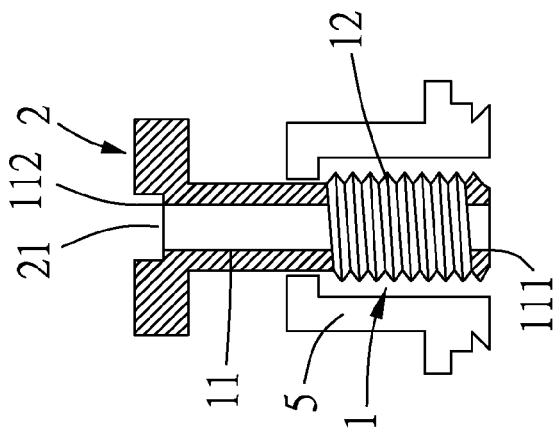
FIGS. 38*a* to 38*c* show some embodiments of the present invention can respectively further include a first operation portion or a second operation portion.
Figure 38B:
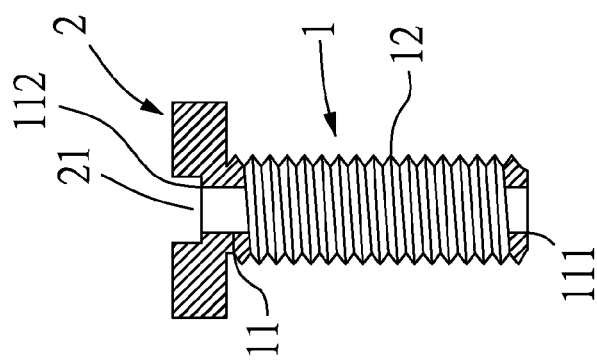
Figure 38A:
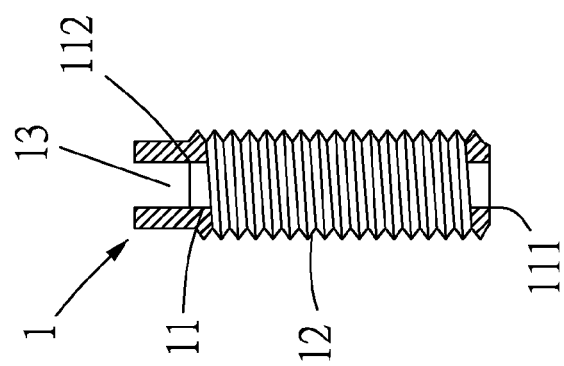
Figure 39A:
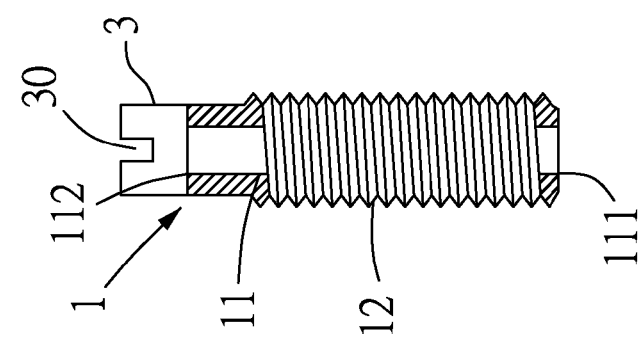
FIGS. 39*a* to 39*c* show the variants of some embodiments of the present invention can respectively further include a third operation portion.
Figure 39B:
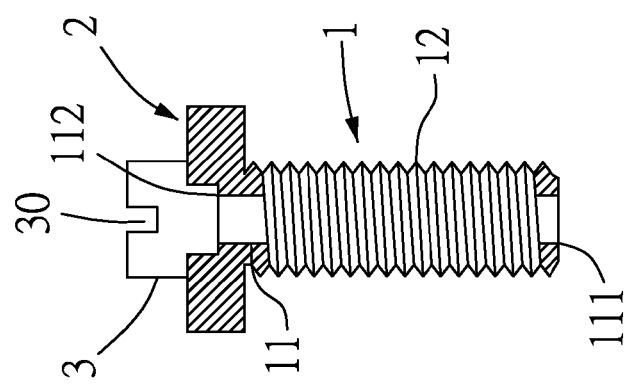
Figure 39C:
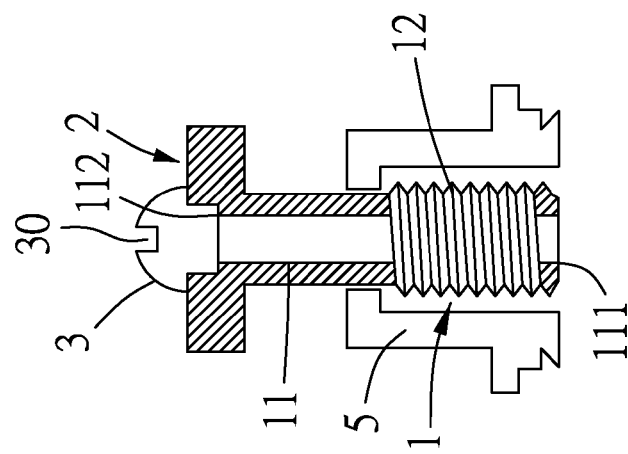
Figure 40C:
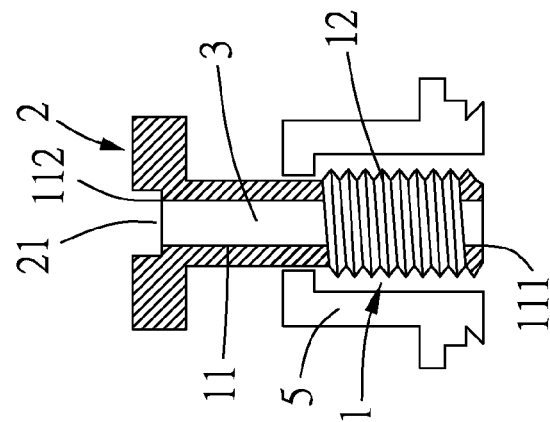
FIGS. 40*a* to 40*c* show the variants of some embodiments of the present invention can respectively further include a first operation portion or a second operation portion.
Figure 40B:
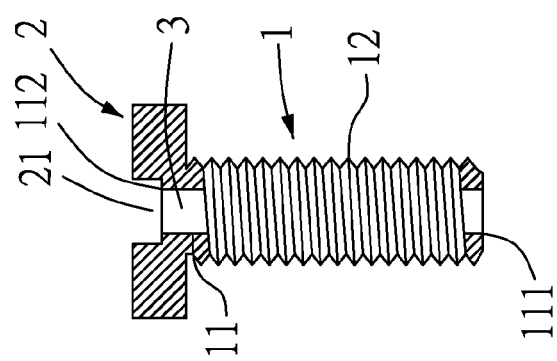
Figure 40A:
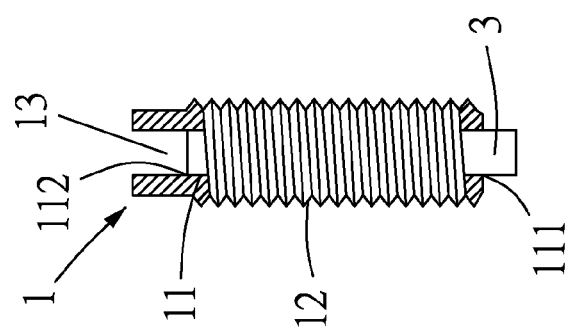
Figure 41:
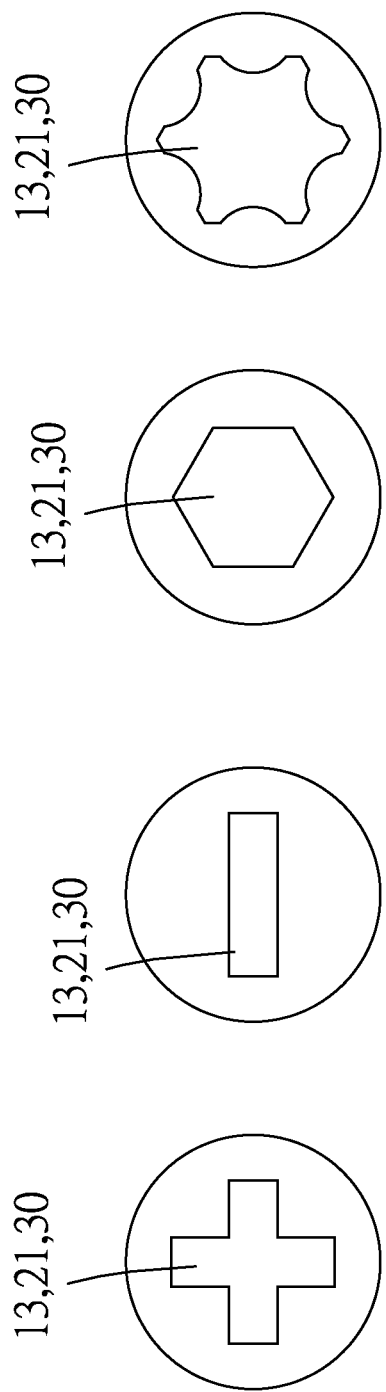
FIG. 41 illustrates top views of some examples of the shape available for the first, the second and the third operation portion according to the present invention.

Please refer to FIGS. 38a to 38c, FIGS. 39a to 39c and FIGS. 40a to 40c. The light-permeable fixing components according to different embodiments and variants of the present invention can respectively further include an operation portion. For example, the light-permeable fixing component shown in FIG. 1a can be provided on the head end of the fixed body 1 with a first operation portion 13 as shown in FIG. 38a, and the light-permeable fixing components shown in FIGS. 2a and 3a can be respectively provided on a top of the fixed head portion 2 with a second operation portion 21 as shown in FIGS. 38b and 38c; the light-permeable fixing components shown in FIGS. 7a, 10a and 13a can be respectively provided on a top of the light-permeable body 3 with a third operation portion 30 as shown in FIGS. 39a to 39c; the light-permeable fixing component shown in FIG. 8a can be provided on the head end of the fixed body 1 with a first operation portion 13 as shown in FIG. 40a; and the light-permeable fixing components shown in FIGS. 11a and 14a can be respectively provided on a top of the fixed head portion 2 with a second operation portion 21 as shown in FIGS. 40b and 40c. FIG. 41 illustrates top views of some examples of the shape available for the first, the second and the third operation portion 13, 21, 30 according to the present invention. As shown, the first, second and third operation portions 13, 21, 30 are slots formed on the top of the fixed body 1 or the fixed head portion 2 and can be linear, cross-shaped, hexagonal, or five petal shaped.

According to the above description, the light-permeable fixing component of the present invention is so structured that light beams from a light source near the light-in opening 111 can be guided by the receiving channel 11 and/or the light-permeable body 3 to the light-out opening 112, making the light-permeable fixing component luminous. Moreover, the light-permeable fixing component of the present invention can also flash along with a flashing light source, or emit light in any manner the same as the provided light source. Thus, the light-permeable fixing component of the present invention can also provide light-guiding, illuminating, flashing and decorating effects. The light source can be so designed that it is actuated to emit light when the light-permeable fixing component of the present invention is driven into the workpieces by a predetermined depth and brings the light-in opening 111 to touch the light source. In this case, the light emitted by the light source can also be guided by the receiving channel 11 and/or the light-permeable body 3 to the light-out opening 112 to lighten the light-permeable fixing component, and the light-permeable fixing component of the present invention is given the function of indicating a specified depth. Furthermore, the light-permeable fixing component of the present invention can be internally provided with a light source (such as a LED) and a power storage device (such as an electrical power storage device) or a powering device (such as an electrical powering device), so that the light-permeable fixing component can be lightened by light beams emitted by the light source and passing through the receiving channel 11 and/or the light-permeable body 3.

The present invention has been described with some preferred embodiments thereof and it is understood that many changes and modifications in the described embodiments can be carried out without departing from the scope and the spirit of the invention that is intended to be limited only by the appended claims.

What is claimed is:
1. A light-permeable fixing component, comprising:
   a fixed body having a fixing portion, the fixing portion being disposed outside the fixed body and being one of a thread, hook engagement bodies, snap-engagement bodies and a column body;
   a receiving channel penetrating the fixed body from a head end to a tail end of the fixed body to form a light-in opening and a light-out opening at the tail end and the head end of the fixed body, respectively; the light-in opening being at a tail side of the fixing portion and the light-out opening being at a head side of the fixing portion; and a light source disposing near the light-in opening to emit a light beam through the receiving channel from the light-in opening to the light-out opening.

* * * * *